US008935428B2

(12) United States Patent
Anderson et al.

(10) Patent No.: US 8,935,428 B2
(45) Date of Patent: Jan. 13, 2015

(54) FAULT TOLERANCE APPROACHES FOR DNS SERVER FAILURES

(75) Inventors: Sam Anderson, Surrey (CA); Dragan Djurovic, Surrey (CA); Eugene Nechamkin, Vancouver (CA); Jamshid Shoghli, North Vancouver (CA)

(73) Assignee: Broadcom Corporation, Irvine, CA (US)

( * ) Notice: Subject to any disclaimer, the term of this patent is extended or adjusted under 35 U.S.C. 154(b) by 872 days.

(21) Appl. No.: 12/608,511

(22) Filed: Oct. 29, 2009

(65) Prior Publication Data

US 2010/0332680 A1 Dec. 30, 2010

Related U.S. Application Data

(60) Provisional application No. 61/219,901, filed on Jun. 24, 2009.

(51) Int. Cl.
G06F 15/16 (2006.01)
H04L 12/26 (2006.01)
H04L 29/12 (2006.01)

(52) U.S. Cl.
CPC ............ *H04L 12/26* (2013.01); *H04L 61/1511* (2013.01); *H04L 61/6009* (2013.01); *H04L 29/12811* (2013.01); *H04L 29/12066* (2013.01)
USPC .......................................... 709/245; 709/223

(58) Field of Classification Search
CPC .. H04L 29/12047–29/12066; H04L 29/12811; H04L 61/15–61/1511; H04L 61/6009
USPC ................................. 709/245, 223
See application file for complete search history.

(56) References Cited

U.S. PATENT DOCUMENTS

| 6,701,363 | B1 * | 3/2004 | Chiu et al. ................... 709/224 |
| 7,130,922 | B1 * | 10/2006 | Barrow ........................ 709/245 |
| 7,552,237 | B2 * | 6/2009 | Cernohous et al. ........... 709/245 |
| 7,565,423 | B1 * | 7/2009 | Fredricksen .................. 709/223 |
| 7,567,582 | B2 * | 7/2009 | Westhead et al. ............. 370/428 |
| 7,720,936 | B2 * | 5/2010 | Plamondon ................... 709/219 |
| 7,853,721 | B2 * | 12/2010 | Awadallah et al. ........... 709/245 |
| 2002/0042821 | A1 * | 4/2002 | Muret et al. .................. 709/223 |

(Continued)

OTHER PUBLICATIONS

Andrews, M., "Negative Caching of DNS queries (DNS NCACHE)", RFC 2308, Mar. 1998.*

(Continued)

*Primary Examiner* — Patrice Winder
*Assistant Examiner* — Julian Chang
(74) *Attorney, Agent, or Firm* — Fiala & Weaver P.L.L.C.

(57) ABSTRACT

Techniques are provided for handling failures of DNS (domain name system) servers to respond to DNS queries. A DNS resolver is configured to resolve domain names, and includes a time-to-live (TTL)-based cache, a negative cache, and a long term store cache. The TTL-based cache is configured to temporarily store domain names with resolved IP addresses. The negative cache is configured to store negative entries that include information indicating domain names that were failed to be resolved. The long term store cache is configured to store domain names with resolved IP address for an indefinite time period. The caches are accessed in a manner that enables fewer DNS query retries to be performed when a DNS server is non-responsive, to reduce delays and network traffic. Furthermore, the DNS resolver may reduce a number of DNS queries performed the longer the DNS server stays non-responsive.

20 Claims, 9 Drawing Sheets

(56) References Cited

U.S. PATENT DOCUMENTS

| | | | |
|---|---|---|---|
| 2004/0039798 A1* | 2/2004 | Hotz et al. | 709/219 |
| 2004/0073707 A1* | 4/2004 | Dillon | 709/245 |
| 2004/0078487 A1* | 4/2004 | Cernohous et al. | 709/245 |
| 2005/0169169 A1* | 8/2005 | Gadde | 370/229 |
| 2005/0204039 A1* | 9/2005 | Douglis et al. | 709/225 |
| 2006/0031394 A1* | 2/2006 | Tazuma | 709/217 |
| 2006/0242227 A1* | 10/2006 | Rao et al. | 709/203 |
| 2007/0041393 A1* | 2/2007 | Westhead et al. | 370/428 |
| 2008/0228899 A1* | 9/2008 | Plamondon | 709/219 |
| 2009/0157889 A1* | 6/2009 | Treuhaft | 709/230 |
| 2009/0210872 A1* | 8/2009 | Dai et al. | 718/1 |
| 2010/0153969 A1* | 6/2010 | Dyba et al. | 719/315 |
| 2010/0217837 A1* | 8/2010 | Ansari et al. | 709/218 |
| 2010/0232592 A1* | 9/2010 | Ku | 379/220.01 |
| 2010/0274970 A1* | 10/2010 | Treuhaft et al. | 711/118 |
| 2010/0306535 A1* | 12/2010 | Jain et al. | 713/168 |
| 2013/0079022 A1* | 3/2013 | Ku | 455/445 |
| 2013/0266132 A1* | 10/2013 | Ku | 379/220.01 |

OTHER PUBLICATIONS

Dilley et al., "Globally Distributed Content Delivery", IEEE Internet Computing, pp. 50-58, Oct. 2002.*

Ballani, Hitesh, and Paul Francis. "A simple approach to DNS DoS mitigation." Irvine Is Burning (2006): pp. 67-72.*

Cohen, Edith, and Haim Kaplan. "Proactive caching of DNS records: Addressing a performance bottleneck." Computer Networks 41.6 (2003): 707-726.*

Ballani, Hitesh, and Paul Francis. "Mitigating DNS dos attacks." Proceedings of the 15th ACM conference on Computer and communications security. ACM, 2008.*

"Architecture Framework Technical Report", PacketCable™ 1.5, PKT-TR-ARCH1.5-V02-070412, Cable Television Laboratories, Inc., (Apr. 12, 2007), 58 pages.

* cited by examiner

FAULT TOLERANCE APPROACHES FOR DNS SERVER FAILURES

This application claims the benefit of U.S. Provisional Application No. 61/219,901, filed on Jun. 24, 2009, which is incorporated by reference herein in its entirety.

BACKGROUND OF THE INVENTION

1. Field of the Invention

The present invention relates to network communications that utilize the resolution of domain names to network addresses.

2. Background Art

Networks, such as the Internet, support various forms of communication. For instance, voice over Internet protocol (VoIP) is a general term for a family of transmission technologies for delivery of voice communications over IP networks such as the Internet or other packet-switched networks. For example, using VoIP, users are enabled to make telephone calls over the Internet using communication devices such as IP phones. When using a VoIP application, a user may expect to hear a dial tone as soon as the user picks up the phone, and may expect to be able to make a call without any problems at any time. However, delays in receiving a dial tone, and other issues, do occur with regard to VoIP telephone calls. Such delays may have various causes.

For instance, the domain name system (DNS) is a hierarchical naming system for computers, services, and further resources participating in communications on the Internet. Each communication device that is configured to communicate over the Internet may be identified by a corresponding DNS domain name, which has an associated IP address. A first communication device may desire to perform a VoIP (or other) communication with a second communication device. The first communication device may identify the second communication device by its domain name. The first communication device may transmit a DNS query that includes the domain name to a DNS server to obtain the IP address for the second communication device, to enable communications with the second communication device. However, a failure of the DNS query may cause a significant amount of network bandwidth to be consumed, because the first communication device may repeatedly transmit the DNS query in further attempts to obtain the IP address for the second communication device. If a large number of communication devices are simultaneously attempting DNS queries that are failing, large amounts of network bandwidth may be consumed, and a voice service outage may even occur.

As such, techniques for avoiding network issues with regard to failed DNS queries are desired.

BRIEF SUMMARY OF THE INVENTION

Methods, systems, and apparatuses are described for handling failed DNS queries and non-responsive DNS servers substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 5A-5D each show portions of a flowchart for a DNS resolution procedure, according to an example embodiment.

Figure 6:
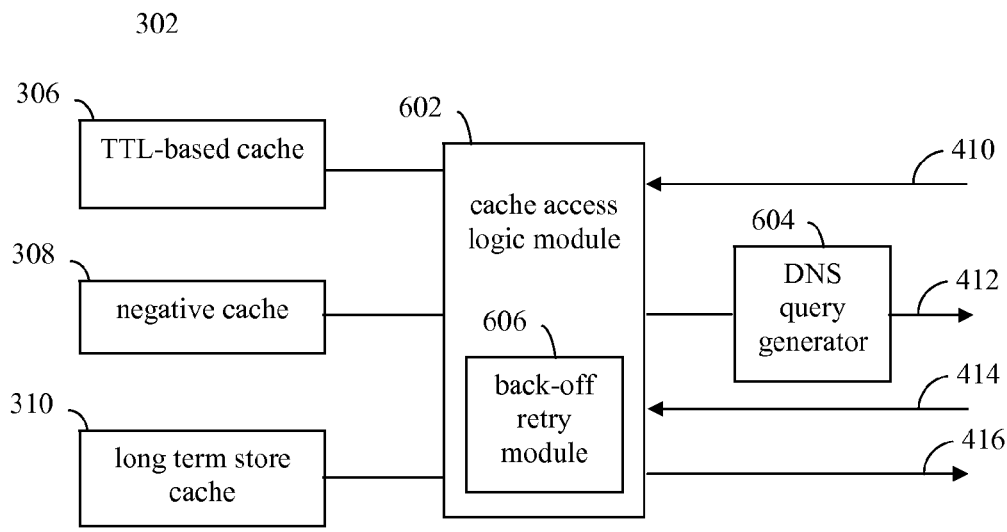

FIG. 6 shows a block diagram of a DNS resolver, according to an example embodiment.

Figure 7:
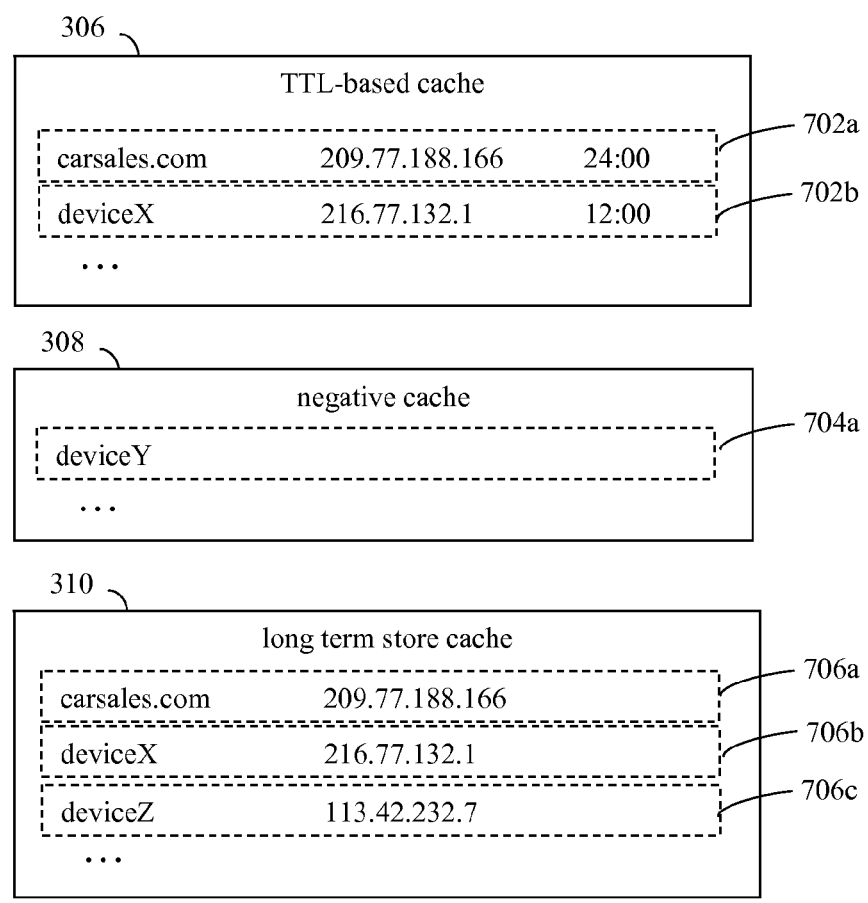

FIG. 7 shows example contents of a time-to-live (TTL)-based cache, a negative cache, and a long term store cache, according to an embodiment.

Figure 8:
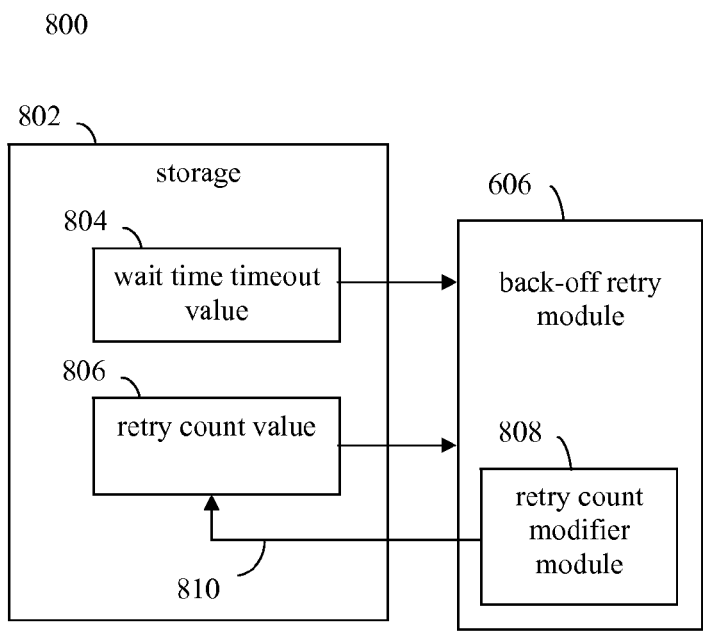

FIG. 8 shows a block diagram of a back-off retry system, according to an example embodiment.

Figure 9:
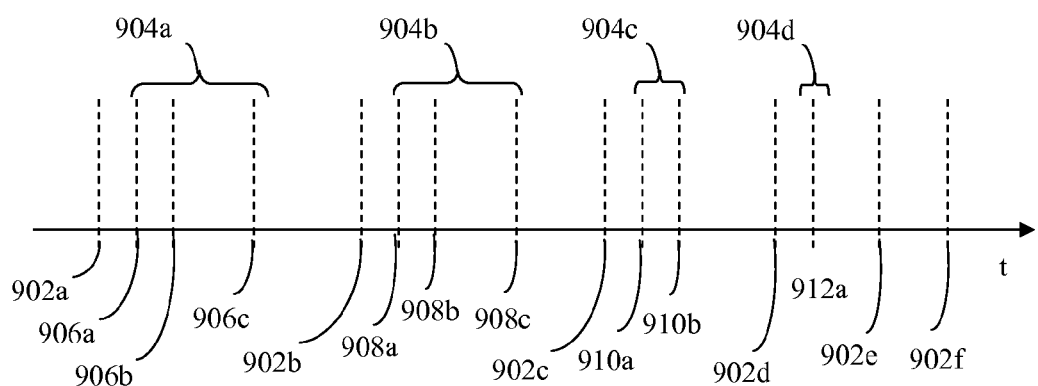

FIG. 9 shows an example time line of DNS queries that may be performed in an embodiment.

Figure 10:
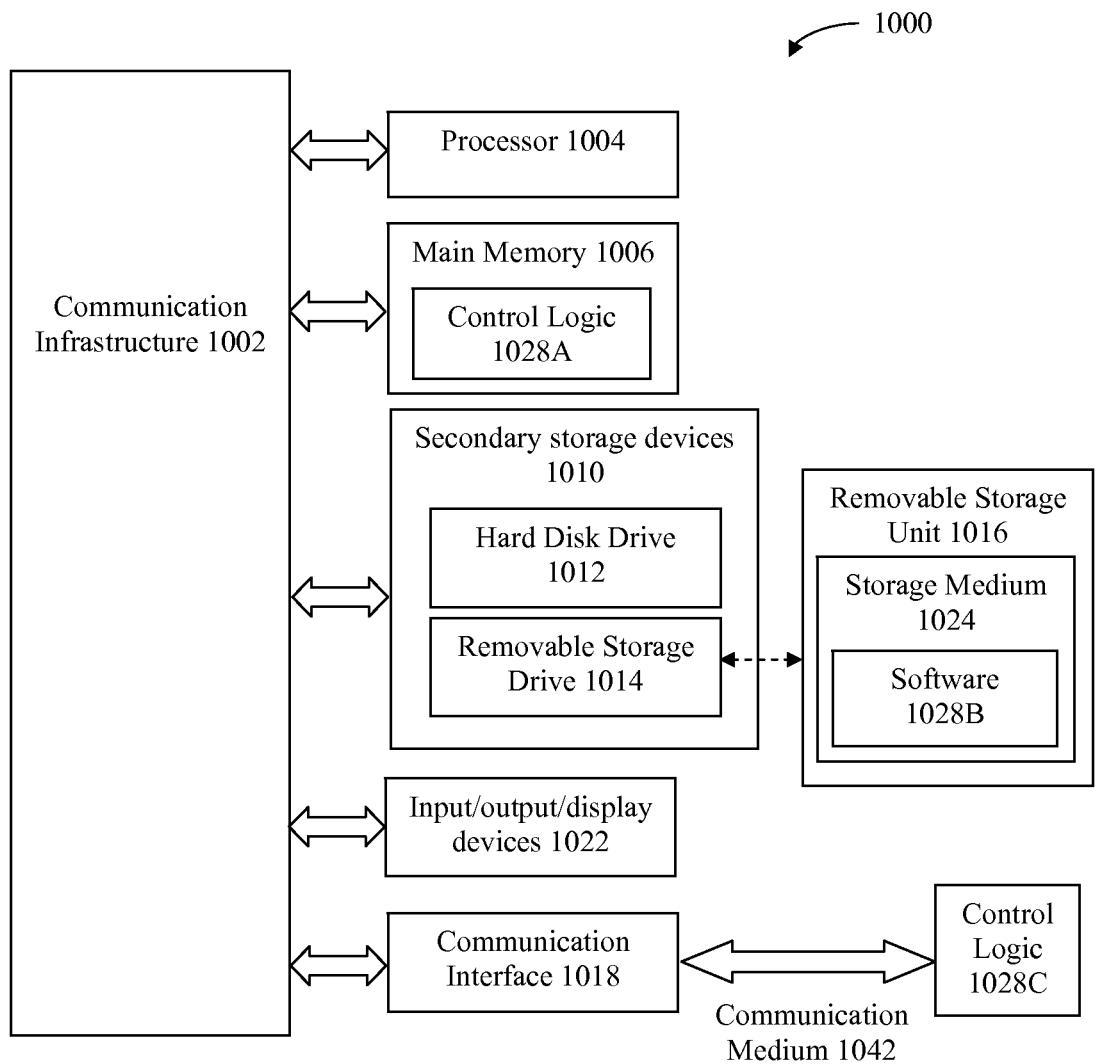

FIG. 10 shows a block diagram of an example computer system in which embodiments of the present invention may be implemented.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Example Communication Systems

Figure 1:
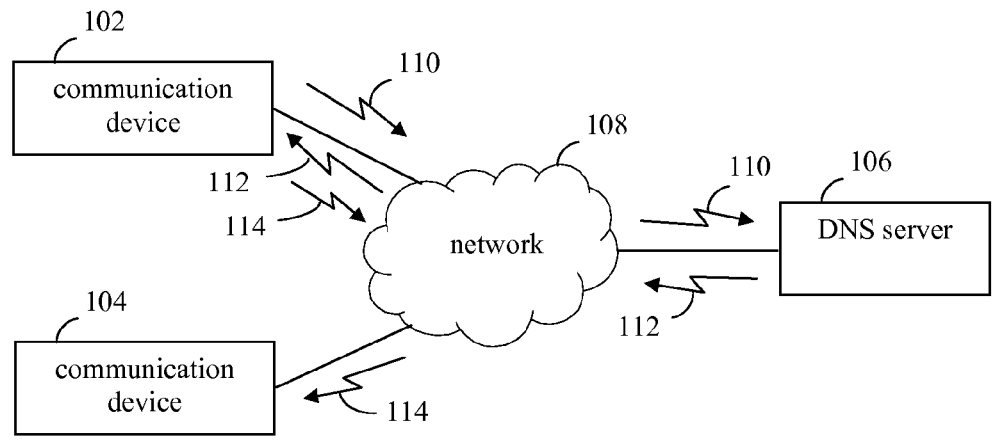
FIG. 1 shows a block diagram of a communication system, according to an example embodiment.

Embodiments of the present invention may be implemented in communication systems to enable network participants to communicate, while reducing network traffic due to DNS queries. For instance, FIG. 1 shows a block diagram of an example communication system 100, according to an embodiment. As shown in FIG. 1, system 100 includes a first communication device 102, a second communication device 104, a DNS server 106, and a network 108. In FIG. 1, first and second communication devices 102 and 104 and DNS server 106 are coupled to network 108, and are enabled to communicate with each other through network 108.

Communication system 100 may be configured in various ways. For instance, first and second communication devices 102 and 104 may be any type of communication device configured for communications through network 108, including VoIP communications (which may also be referred to as IP telephony, Internet telephony, voice over broadband (VoBB), broadband telephony, etc.), text messaging, web page browsing, etc. Examples of first and second communication devices 102 and 104 include IP phones, desktop computers (e.g., a personal computer, etc.), servers, mobile computing devices (e.g., a cell phone, smart phone, a personal digital assistant (PDA), a laptop computer, a notebook computer, etc.), etc. Network 108 may be any type of communication network, including a local area network (LAN), a wide area network (WAN), a personal area network (PAN), or a combination of communication networks, where domain name-to-address resolution is performed to enable communications. For example, network 108 may be an IP network, such as the Internet or other packet-switched network, configured for delivery of voice communications (VoIP) and/or other types of data (e.g., text messaging, web pages, etc.).

First communication device 102 may communicate with second communication device 104. For instance, a first user at first communication device 102 may desire to initiate a voice (e.g., VoIP) conversation with a second user at second communication device 104, may desire to transmit an instant message (e.g., to the second user at second communication device 104, or may desire to otherwise communicate with the second user at second communication device 104. In another example, a user at first communication device 102 may desire to access a website hosted by second communication device 104, which may be a web server. In each case, first communication device 102 may have a domain name that identifies second communication device 104. First communication device 102 may communicate with DNS server 106 to resolve the domain name to an IP address for second communication device 104, so that first communication device 102 may be enabled to transmit a communication signal to second communication device 104.

For instance, as shown in FIG. 1, first communication device 102 may be configured to transmit a communication signal to second communication device 104 through network 108. Prior to transmitting the communication signal, first communication device 102 transmits a DNS query 110 to DNS server 106 through network 108. DNS query 110 includes a domain name associated with second communication device 104, and is a request to DNS server 106 to provide the IP address associated with the domain name. For instance, second communication device 104 may have the associated domain name "secondcomdevice.net," and may have the IP address "172.16.254.1". DNS server 106 may store domain names and associated IP addresses for any number of communication devices, including second communication device 104.

As shown in FIG. 1, DNS server 106 may receive DNS query 110. DNS server 106 may determine the IP address for second communication device 104 based on the domain name received in DNS query 110, and may transmit a DNS response 112 to first communication device 102 through network 108 that includes the determined IP address. First communication device 102 receives DNS response 112. First communication device 102 receives the IP address for second communication device 104 from DNS response 112, and transmits a communication signal 114 to second communication device 104 through network 108. Communication signal 114 includes the determined IP address for second communication device 104, and thus can be routed to second communication device 104.

A. Example Communication Environments

As described above, communication system 100 may have various configurations, depending on the particular application. For instance, in one embodiment, first and second communication devices 102 and 104 may be computing systems, and communication signal 114 may be an instant message. In another embodiment, first communication device 102 may be a computing device, second communication device 104 may be a web server, and communication signal 114 may be a request for a web page. In still another embodiment, first and second communication devices 102 and 104 may be IP phones, and communication signal 114 may be a phone call from first communication device 102 to second communication device 104.

Figure 2:
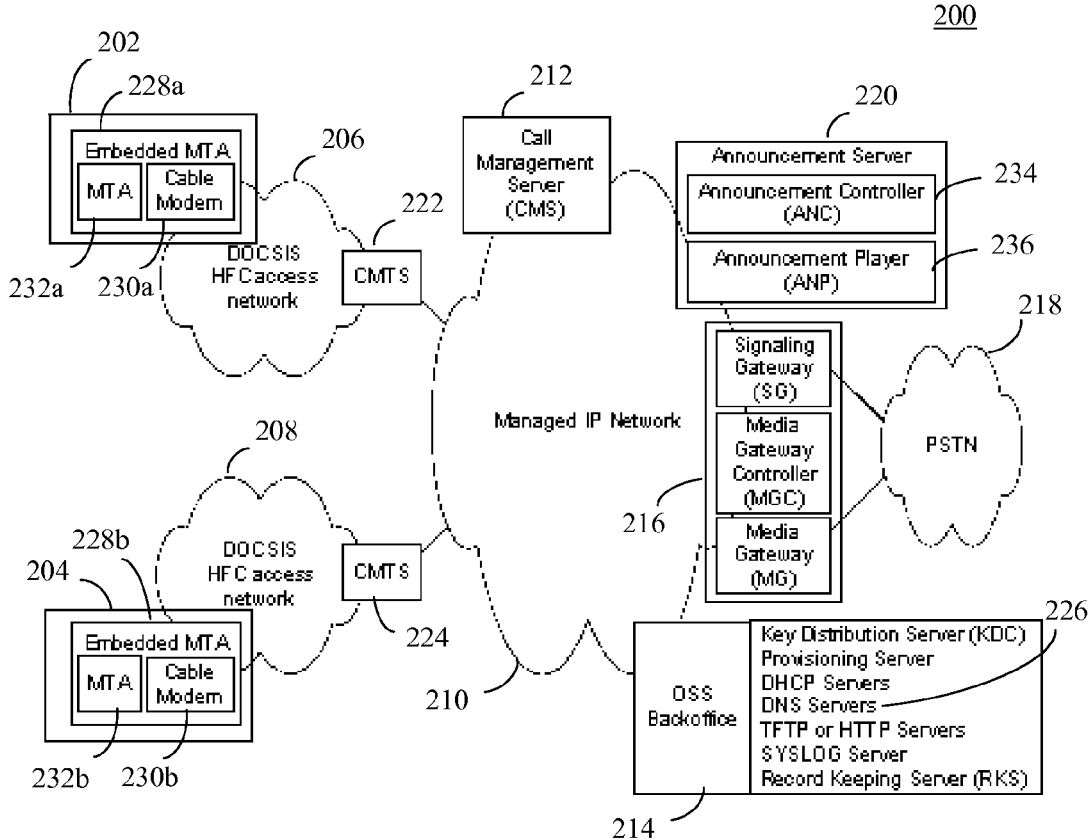
FIG. 2 shows a block diagram of a communication system that is an example of the communication system of FIG. 1, according to an example embodiment.

For instance, FIG. 2 shows a communication system 200, according to an embodiment. Communication system 200 is an example of communication system 100 shown in FIG. 1. As shown in FIG. 2, system 200 includes first and second communication devices 202 and 204, first and second DOCSIS (data over cable service interface specification) networks 206 and 208, an IP network 210, a call management server (CMS) 212, an operational support system (OSS) 214, a gateway 216, a public switched telephone network (PSTN) 218, an announcement server 220, a first cable modem termination system (CMTS) 222, and a second CMTS 224. Communication system 200 enables communication devices, such as communication devices 202 and 204, to communicate with each other through DOCSIS networks (e.g., DOCSIS networks 206 and 208) and IP networks (e.g., IP network 210). Note that system 200 is provided for illustrative purposes, and not all elements/features of system 200 need be present in all embodiments. Communication system 200 is described as follows.

First and second DOCSIS networks 206 and 208 may be any type of DOCSIS network, including DOCSIS HFC (hybrid fiber coaxial) access network. First CMTS 222 provides connectivity between the first DOCSIS network 206 and IP network 210, and second CMTS 224 provides connectivity between second DOCSIS network 208 and IP network 210. As shown in FIG. 2, gateway 216 may include a signaling gateway, a media gateway controller, and a media gateway. The signaling gateway (SG) and the media gateway (MG) provide connectivity between IP network 210 and PSTN 218.

First and second DOCSIS networks 206 and 208 enable high-speed, reliable, and secure transport between communication devices 202 and 204 (e.g., users/customers) and the cable headends at CMTS 222 and 224, respectively. First and second DOCSIS networks 206 and 208 provide DOCSIS capabilities, including Quality of Service. IP network 210 is an example of network 108 in FIG. 1. IP network 210 provides various functions, including providing an interconnection between the functional components that are responsible for signaling, media, provisioning, and the establishment of Quality of Service on DOCSIS networks 206 and 208. In addition, IP network 210 provides long-haul IP connectivity between DOCSIS networks 206 and 208 and other IP networks. IP network 210 may be considered to include CMS 212, OSS 214, and gateway 216.

First and second communication devices 202 and 204 are examples of first and second communication devices 102 and 104 in FIG. 1. For instance, first and second communication devices 202 and 204 may be customer premises equipment (CPE) devices, such as telephones, computers with communication capability (e.g., VoIP), etc. As shown in FIG. 2, first communication device 202 has an EMTA (embedded multimedia terminal adaptor) 228a, which includes a cable modem (CM) 230a and a multimedia terminal adapter (MTA) 232a. Cable modem 230a enables bidirectional communications using RF (radio frequency) communication channels over first DOCSIS network 206, which may provide broadband Internet access in the form of cable Internet. MTA 232a is a VoIP adaptor that enables VoIP communications for first communication device 202 through first DOCSIS network 206 and IP network 210. Second communication device 204 also has an embedded MTA 228b that includes a cable modem 230b and MTA 232b, and thus provides similar communication functionality to first communication device 202.

Each MTA 232 is a client device that contains a subscriber-side interface to the subscriber's communication device (e.g., device 204 or 206) and a network-side signaling interface to call control elements in the network. An MTA 232 provides codecs (coder-decoders) and signaling and encapsulation functions for media transport and call signaling. MTAs 232 may be connected to other network elements by the corresponding DOCSIS network (e.g., network 206 or 208). Note that in an embodiment, an EMTA 228 may include an IP address for the corresponding cable modem 230 and an IP address for the corresponding MTA 232.

In the example of FIG. 2, each cable modem 230 is a network element that is defined by DOCSIS. Each cable modem 230 is a modulator/demodulator that provides data transmission over the corresponding DOCSIS network (e.g., network 206 or 208) using the DOCSIS protocol. Each cable modem 230 handles the media stream and provides services such as classification of traffic into service flows, rate shaping, and prioritized queuing.

CMTS 222 and CMTS 224 each provide data connectivity and complementary functionality to cable modems 230a and 230b, respectively, over the corresponding DOCSIS network (e.g., network 206 or 208). Each of CMTS 222 and 224 also provides connectivity to a wide area networks (e.g., IP network 210), and may be located at a cable television system head-end or distribution hub. Each of CMTS 222 and 224 is responsible for allocating and scheduling upstream and downstream bandwidth in accordance with MTA requests and QoS authorizations established by a gate controller (included in CMS 212).

CMS 212 provides call control and signaling related services for the MTA, CMTS, and PSTN gateways in system 200. CMS 212 is a trusted network element that resides on the managed IP portion of system 200. With regard to gateway 216, the MGC is a logical signaling management component used to control PSTN Media Gateways. The MGC maintains the call state and controls the overall behavior of gateway 216. The MGC receives and mediates call-signaling information between the IP network 210 and PSTN 218. The MGC maintains and controls the overall call state for calls requiring a PSTN interconnection. The MGC controls the media gateway by instructing it to create, modify, and delete connections that support the media stream over IP network 210. The signaling gateway (SG) provides a signaling interconnection function between the PSTN signaling network (PSTN 218) and IP network 210. The media gateway (MG) terminates the bearer paths and transcodes media between PSTN 218 and IP network 210.

OSS 214 includes business, service, and network management components supporting core business processes. As defined by the ITU TMN framework, the main functional areas for OSS are fault management, performance management, security management, accounting management, and configuration management. As shown in FIG. 2, OSS 214 includes one or more of a key distribution server (KDC), a provisioning server, one or more DHCP (dynamic host configuration protocol) servers, one or more DNS (domain name system) servers 226, one or more TFTP (trivial file transfer protocol) and/or HTTP (hypertext transfer protocol) servers, a SYSLOG server, and/or a recording keeping server (RKS).

The KDC is a security server. The DHCP server is a back office network element used during an MTA device provisioning process to allocate IP addresses and other client configuration information. DNS server 226 is an example of DNS server 106 of FIG. 1, and is a back office network element used to map between domain names and IP addresses. The TFTP server is a back office network element used during the MTA device provisioning process to download a configuration file to the MTA. An HTTP server may be used for the same purpose instead of a TFTP server. The SYSLOG server is an optional back office network element used to collect event notification messages indicating that certain events such as device errors have occurred. The RKS is a trusted network element component that receives event messages from other trusted network elements such as the CMS, CMTS, and MGC. The RKS may act as a short-term repository for the event messages. The RKS may assemble or correlate the event messages into coherent sets or call detail records (CDRs), which are then made available to other back office systems such as billing or fraud detection.

Announcement Server (ANS) 220 is a network component that manages and plays informational tones and messages in response to events that occur in IP network 210. ANS 220 includes an announcement controller (ANC) 234 and an announcement player (ANP) 236. ANC 234 initiates and manages all announcement services provided by ANP 236. ANP 236 is a media resource server responsible for receiving and interpreting commands from ANC 234 and for delivering the appropriate announcement(s) to the MTAs.

For further detail regarding communication system 200 of FIG. 2, refer to "PacketCable™ 1.5 Architecture Framework Technical Report PKT-TR-ARCH1.5-V02-070412," Revision IO2 released Apr. 12, 2007, copyright Cable Television Laboratories, Inc., which is incorporated herein by reference in its entirety. As mentioned above, communication system 200 (e.g., a PacketCable 1.5 architecture) is an example of communication system 100 shown in FIG. 1. Note that for illustrative purposes, embodiments may be described herein in terms of the features of system 200 of FIG. 2. However, such embodiments are not intended to be limiting. Embodiments of the present invention may be implemented in further communication system types, including those mentioned elsewhere herein, other systems that communicate over cable (e.g., a PacketCable 2.0 architecture using the SIP (Session Initiation Protocol) protocol, etc.), as well as further communication systems that would be known to persons skilled in the relevant art(s).

III. Example Issues with DNS Queries, and Example Cache Embodiments

The communication systems described above may have problems when requests to resolve domain names fail. For example, referring to system 200 of FIG. 2, a user at first communication device 202 may be desire to conduct a voice communication with a user at second communication device 204 or at telephone coupled to PSTN 218. The voice communication may be conducted by EMTA 228*a* of first communication device 202, through first DOCSIS network 206 and IP network 210, to the user at second communication device 204 (through second DOCSIS network 208) or at the telephone coupled to PSTN 218. DNS server 226 may be requested by first communication device 202 to provide an IP address for CMS 212 and/or for second communication device 204 to enable the voice communication. DNS server 226 may fail to provide the requested IP address, and may be completely unresponsive. Such a failure of DNS server 226 may result in telephony signal delays and interruptions leading to undesirable effects in user experience.

When resolving a fully qualified domain name (FQDN), a communication device may first access a local short term or temporary cache to determine whether an IP address corresponding to this FQDN was stored there previously (e.g., after the domain name was previously resolved). If the temporary cache does not store the IP address, the communication device may transmit a DNS query to the DNS server. In response, the DNS server may transmit one or more IP addresses and an associated time to live (TTL) (e.g., time out value) for the IP address(es) to the communication device. The communication device may use an IP address received in the response to perform a communication, and may store the IP address(es) in the temporary cache. The IP address may be stored in the temporary cache until the TTL value expires. Use of this temporary cache for storing resolved IP addresses has the benefit of reducing domain name resolution delays due to DNS queries, and may reduce a number of queries transmitted to the DNS server for IP addresses that are used regularly.

A cable company or other entity that operates DOCSIS networks may be referred to as a multi-system operator (MSO). In an embodiment, to address specific MSO requirements for handling DNS server failures, an additional "permanent" or long term cache may be maintained in first communication device 202 that does not expire according to the TTL time out value. IP addresses obtained due to successful DNS queries may be stored in the long term cache as well as the temporary cache. When resolution of a domain name that has previously been resolved is needed, but the TTL for the resolution has expired, and if DNS server 226 fails to provide a valid response to a DNS query, the long term cache may be accessed for the IP address. Because an EMTA typically stores relatively few FQDNs in the long term cache, a loss of DNS server 226 may be tolerated for long periods of time without requiring a prohibitively large long term cache size.

A "back-off and retry" process may be performed by a communication device after an initial failure of a DNS server to respond to a DNS query, to repeatedly retry the DNS query after progressively longer waiting periods. The DNS query may be repeatedly retried in the hopes that a response is eventually received, up to a predetermined number of retries. However, such a process results in delays associated with a need to send multiple requests to the DNS server, and the need to wait for each response for some predefined period of time.

For general network applications (e.g., Internet browsing, e-mail transactions), network delays of short periods of time due to repeated DNS query attempts may not significantly affect application functionality or user experience. For VoIP applications, however, even short delays may be undesirable to users. For example, when a user accesses an IP telephone (e.g., first communication device 202) to make a call, the communication device may attempt to resolve one or more domain names used to enable the call. Depending on the particular call flow, multiple DNS queries may be required. If domain name resolution is delayed, a user will not hear a dial tone for the duration of the resolution process. This delay may be perceived by a user as a service failure and may negatively affect the user experience.

Existing solutions based on the standards that define the DNS backoff and retry behavior (RFC1034, RFC1035, RFC2308) do not meet the stringent requirements of the VoIP Applications. In another example solution to the retry delay, lookups may be performed proactively as each cache TTL is about to expire. In such a procedure, the DNS lookup may be performed asynchronously to the telephony application, and hence may avoid the situation where the look up delay occurs in series. In the event of a DNS failure, the cache TTL could be reset to keep the IP address associated with the failed domain resolution attempt stored in the cache. However, a drawback to such an approach is that it forces DNS traffic to occur from every communication device for each DNS IP address entry periodically at slightly less than the TTL for each DNS entry. Considering that thousands of communication devices may perform this procedure to maintain IP addresses, and depending on the TTL values and number of IP address entries, the combined amount of network traffic may be very large, leading to network delays.

Thus, techniques are desired that enable VoIP applications to minimize delays associated with the domain name resolution procedure.

IV. Example DNS Resolution Embodiments

In embodiments, DNS resolution techniques are provided that are more fault tolerant to potential failures at DNS servers than conventional techniques. Embodiments enable fewer DNS query retries to be performed when a DNS server is non-responsive, to reduce delays and network traffic. In an embodiment, a number of DNS queries is reduced on a continuous basis the longer the DNS server stays non-responsive.

Figure 3:
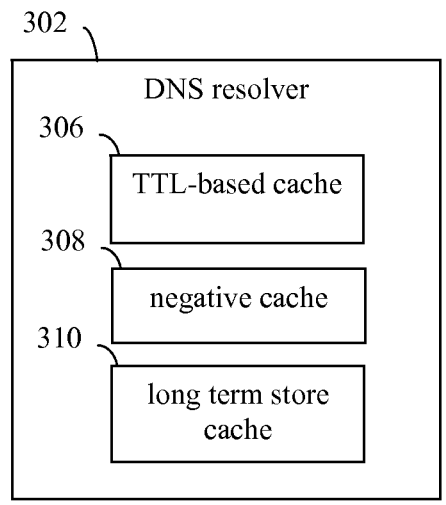
FIG. 3 shows a block diagram of a DNS resolver, according to an example embodiment.

For instance, FIG. 3 shows a block diagram of a DNS resolver 302, according to an example embodiment. DNS resolver 302 may be included in first and/or second communication devices 102 and 104 shown in FIG. 1 (and in first and/or second communication devices 202 and 204 shown in FIG. 2), for example. DNS resolver 302 is configured to resolve IP addresses for domain names in a more efficient manner than in conventional techniques. As shown in FIG. 3, DNS resolver 302 includes a time-to-live (TTL)-based cache 306, a negative cache 308, and a long term store cache 310. TTL-based cache 306 is configured to store domain names with resolved IP addresses for time periods defined by associated time out or "time-to-live" values (TTLs). As such, IP addresses stored in TTL-based cache 306 expire after a period of time. Negative cache 308 is configured to store negative entries that include information indicating domain names that were failed to be resolved. Long term store cache 310 is configured to store domain names with resolved IP address for an indefinite time period (e.g., may be replaced with a more recently resolved IP address for the domain name).

TTL-based cache 306, negative cache 308, and long term store cache 310 may be included in one or more storage devices of a communication device, such as a magnetic disc (e.g., in a hard disk drive), an optical disc (e.g., in an optical disk drive), a memory device such as a RAM device, an EPROM device (e.g., a flash memory device), etc., and/or any other suitable type of read/write storage medium.

DNS resolver 302 is configured to determine IP addresses to enable communications. For example, one or more IP addresses may be needed to be determined for one or more domain names to perform a particular communication (e.g., a voice communication, an instant message communication, a web page request, etc.). DNS resolver 206 may access TTL-based cache 306 to determine if an address corresponding to a desired domain name is present. As described above, entries in TTL-based cache 306 have an expiration time. If TTL-based cache 306 does not include an address for the domain name, negative cache 308 may be accessed for a negative entry associated with the domain name. A negative entry in negative cache 308 for the domain name indicates that a previous attempt to obtain the address for the domain name from a DNS server failed. If a negative entry is present in negative cache 308, DNS resolver 204 may access long term store cache 310 for the address corresponding to the domain name, which was previously stored in long term store cache 310 after being obtained from the DNS server. If a negative entry was not present in negative cache 308, a DNS query (that includes the domain name) may be transmitted by DNS resolver 302 to DNS server 106 to obtain the IP address. If the DNS query fails, DNS resolver 302 may retry the DNS query one or more times. If the subsequent DNS queries fail, DNS resolver 204 may access long term store cache 310 for the address corresponding to the domain name.

Figure 4:
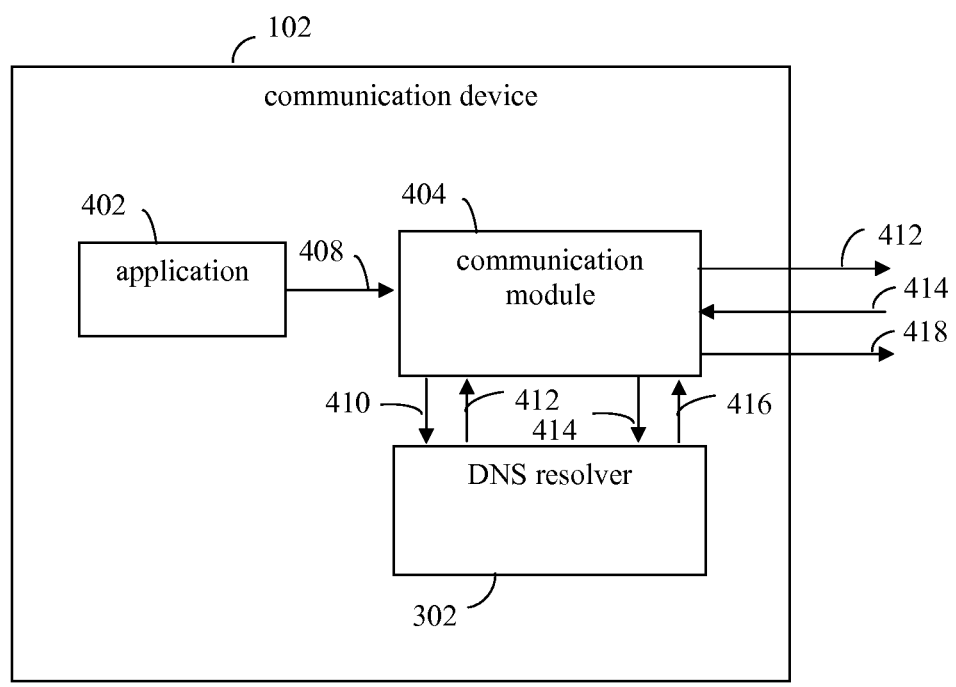
FIG. 4 shows a block diagram of a communication device having a DNS resolver implemented therein, according to an example embodiment.

DNS resolver 302 may be implemented in a communication device in any manner to provide for domain name resolution. For instance, FIG. 4 shows a block diagram of communication device 102 of FIG. 1 with DNS resolver 302 implemented therein, according to an example embodiment. As shown in FIG. 4, communication device 102 includes an application 402, a communication module 404, and DNS resolver 302. Application 402 may be any application configured to enable network communications, including a voice application (e.g., a VoIP application), an instant messaging application, a web browser, etc. Communication module 402 is configured to enable communication device 102 to communicate over a network, such as network 108 of FIG. 1. Communication module 402 may include any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, etc.

As shown in FIG. 4, application 402 may generate a communication request 408, which may include information to be transmitted to a second communication device, such as communication device 104 shown in FIG. 1, and may include a domain name associated with the second communication device. Communication module 404 may receive communication request 408, and may transmit a domain name resolution request 410 to DNS resolver 302 for the domain name of communication request 408. Depending on the particular domain name, DNS resolver 302 may resolve an IP address for the domain name (e.g., if the address is stored in TTL-based cache 306 or long term store cache 310, as described above), or may generate a DNS query 412 to request that the address be resolved by a DNS server, such as DNS server 106 of FIG. 1. Communication module 404 receives DNS query 412, and transmits DNS query 412 over network 108 to DNS server 106. DNS server 106 may transmit a DNS response 414, which is received by communication module 404. DNS resolver 302 receives DNS response 414 from communication module 404. If DNS response 414 includes the resolved IP address, DNS resolver 302 transmits a resolved IP address 416 to communication module 404. Communication module 404 uses the received resolved IP address to transmit a communication signal 418 to the communication device having the resolved IP address. In this manner, a VoIP phone call may be established, an instant message may be transmitted, a web page may be requested, or other network communication may be performed.

If DNS response 414 does not include the resolved IP address, or if DNS response 414 is not received at all from DNS server 106, DNS resolver 302 may retry DNS query 412 until a resolved IP address is received, or until a predetermined retry count is reached. In such case, DNS resolver 302 may access long term store cache 310 for the IP address associated with the domain name, and may provide the IP address to communication module 404 in resolved IP address 416, to be used to transmit communication signal 418.

Communication device 102 may perform such an IP address resolution process in various ways. For instance, FIGS. 5A-5D each show portions of a flowchart 500 that illustrates a DNS resolution procedure, according to example embodiment. For example, flowchart 500 may be performed by communication device 102 in FIG. 1. Flowchart 500 is described as follows. Note that not all steps shown in FIGS. 5A-5D need to be performed in all embodiments, nor do the steps shown in FIGS. 5A-5D necessarily need to be performed in the order shown. Other structural and operational embodiments will be apparent to persons skilled in the relevant art(s) based on the discussion regarding flowchart 500. Flowchart 500 is described as follows.

Note that initially, DNS resolver 302 may operate in a "normal mode," in which a failure to resolve a domain name with a DNS server has not yet occurred. As described further below, if a DNS server fails to respond to a domain name resolution request, DNS resolver 302 may enter a "failure mode." If DNS resolver 302 is subsequently able to communicate with the DNS server and/or to resolve the domain name using the DNS server, DNS resolver 302 may transition back to the "normal mode."

Figure 5A:
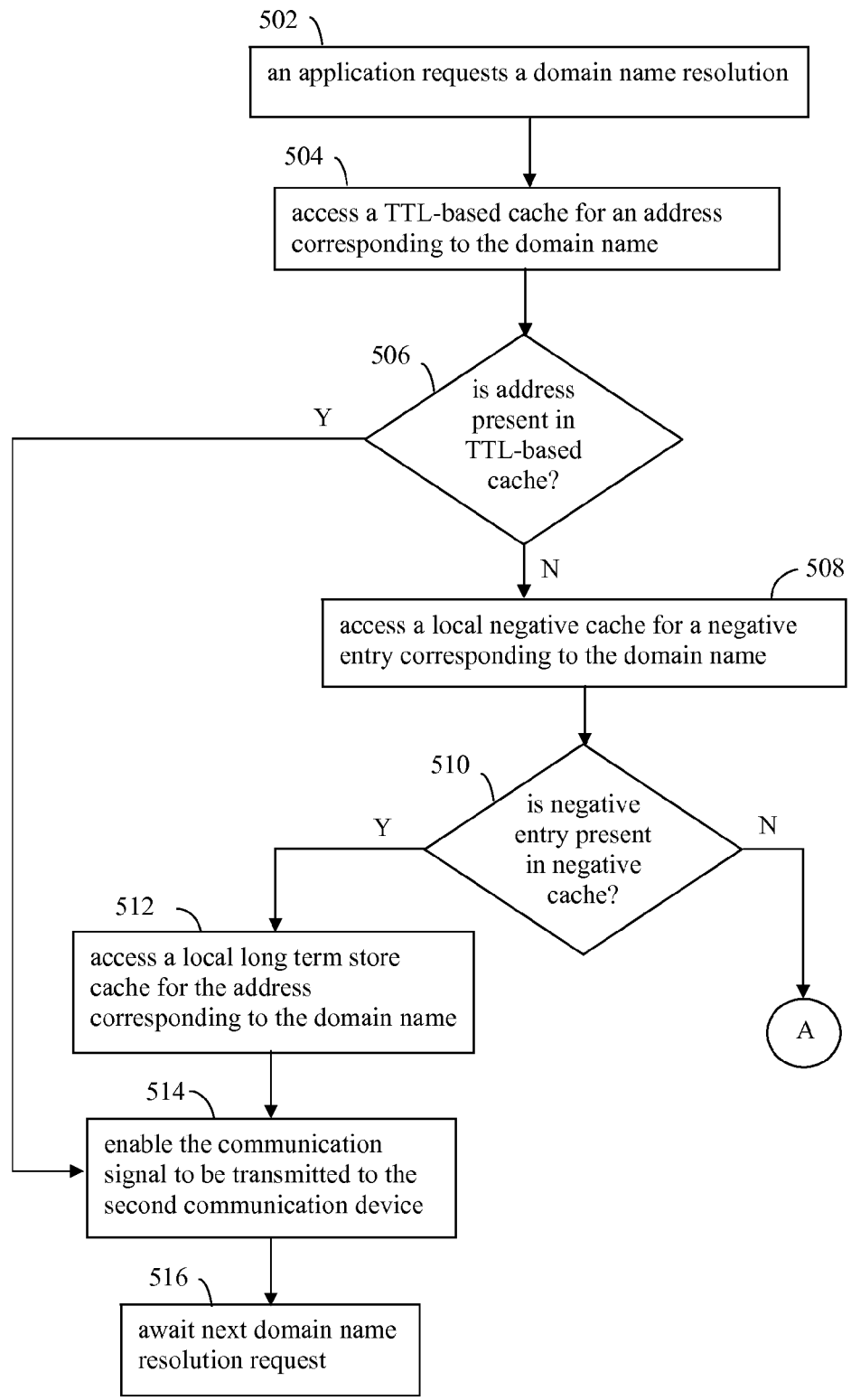

Referring to FIG. 5A, flowchart 500 begins with step 502. In step 502, an application requests a domain name resolution. For example, as shown in FIG. 4, communication module 404 may generate domain name resolution request 410, to resolve a domain name associated with communication request 408 (generated by application 402) to an IP address. For example, a VoIP application of communication device 202 may request the domain name resolution to enable a VoIP call to a device (e.g., second communication device 104), or through a device (e.g., CMS 212), having the domain name requested to be resolved to an IP address. Alternatively, domain name resolution may be requested for a web server, an instant message session, or other communication. Note that in an alternative embodiment, application 402 may initiate domain name resolution request 410 directly with DNS resolver 302 (rather than through communication module 404). Operation proceeds to step 504.

In step 504, a TTL-based cache is accessed for an address corresponding to the domain name. For example, as shown in FIG. 3, DNS resolver 302 may access TTL-based cache 306 for an IP address corresponding to the domain name received in a domain name resolution request. FIG. 6 shows a block diagram of DNS resolver 302, according to an example embodiment. As shown in FIG. 6, DNS resolver 302 may include TTL-based cache 306, negative cache 308, long term store cache 310, a cache access logic module 602, and a DNS query generator 604. Cache access logic module 602 may be configured to perform accesses of TTL-based cache 306, negative cache 308, long term store cache 310 for DNS resolver 302. For example, as shown in FIG. 6, cache access logic module 602 may receive domain name resolution request 410. Cache access logic module 602 may access TTL-based cache 306 for an IP address corresponding to the domain name in request 410. Operation proceeds to decision 506.

For illustrative purposes, FIG. 7 shows example contents of TTL-based cache 306, negative cache 308, long term store cache 310, according to an embodiment. The contents of TTL-based cache 306, negative cache 308, long term store cache 310 shown in FIG. 7 are provided for purposes of illustration, and are not intended to be limiting. As shown in FIG. 7, TTL-based cache 306 may include one or more temporary entries 702, which each include a domain name, an IP address corresponding to the domain name, and a timeout or time to live (TTL) time value that indicates how long the particular entry 702 will be maintained in TTL-based cache 306 before expiring (e.g., before being deleted). Entries 702 may optionally include further information, in embodiments. In the example of FIG. 7, two entries 702a and 702b are shown present in TTL-based cache 306. First entry 702a includes the domain name "carsales.com," the corresponding IP address "209.77.188.166," and the timeout value of 24 hours. Second entry 702b includes the domain name "deviceX," the corresponding IP address "216.77.132.1," and the time out value of 12 hours.

Negative cache 308 may include one or more negative entries 704, which each include a domain name. Negative entries 704 may optionally include further information, in embodiments. Each negative entry 704 indicates that a previous attempt to resolve the indicated domain name failed (e.g., an error message or no response to a DNS query was received). In the example of FIG. 7, one negative entry 704a is shown present in negative cache 308. Negative entry 704a includes the domain name "deviceY," indicating that a previous attempt to resolve "deviceY" failed. Note that in an embodiment, negative entries 704 in negative cache 308 may expire (e.g., and be deleted) after being present in negative cache 308 for a predetermined timeout value for negative cache 308.

Long term store cache 310 may include one or more long term entries 706, which each include a domain name and a corresponding IP address that was previously resolved for the domain name. Entries 706 may optionally include further information, in embodiments. In the example of FIG. 7, three entries 706a-706c are shown present in long term store cache 310. First entry 706a includes the domain name "carsales.com" and corresponding IP address "209.77.188.166" (corresponding to entry 702a in TTL-based cache 306). Second entry 706b includes the domain name "deviceX," and the corresponding IP address "216.77.132.1" (corresponding to entry 702b in TTL-based cache 306). Third entry 706c includes the domain name "deviceZ," and the corresponding IP address "113.42.232.7." No entry 706 is present in TTL-based cache 306 corresponding to third entry 702c of TTL-based cache 306, because the entry 706 expired from TTL-based cache 306 (due to its associated timeout value). Note that entries 706 in long term store cache 310 do not expire, although they may be replaced with updated information received when the stored domain names are subsequently resolved.

Referring back to FIG. 5A, at decision 506, whether an address is present in TTL-based cache is determined. For example, if during the access of step 504, cache access logic module 602 determines that an address is present in TTL-based cache 306 corresponding to the domain name in request 410, operation proceeds to step 514. If cache access logic module 602 determines that an address is not present in TTL-based cache 306 corresponding to the domain name, operation proceeds to step 508.

In step 508, a local negative cache is accessed for a negative entry corresponding to the domain name. For example, referring to FIG. 6, cache access logic module 602 may access negative cache 308 for a negative entry corresponding to the domain name in request 410 because an entry was not present in TTL-based cache 306 for the domain name. Operation proceeds to decision 510.

At decision 510, whether a negative entry is present in negative cache is determined. For example, if during the access of step 508, cache access logic module 602 determines that a negative entry is present in negative cache 308 corresponding to the domain name in request 410, operation proceeds to step 512. If cache access logic module 602 determines that a negative entry is not present in negative cache 308 corresponding to the domain name (e.g., the negative entry timed out, or no negative entry was ever present for the domain name), operation proceeds to step 518 (in FIG. 5B).

In step 512, a local long term store cache is accessed for the address corresponding to the domain name. For example, cache access logic module 602 may access long term store cache 310 for an IP address corresponding to the domain name in request 410. Operation proceeds to step 514.

In step 514, the communication signal is enabled to be transmitted to the second communication device. For example, cache access logic module 602 may provide the IP address accessed in long term store cache 310 to communication module 404 in resolved IP address 416, to enable communication module 404 to transmit communication signal 418 to the communication device having the resolved IP address.

In step 516, a next domain name resolution request is awaited.

Figure 5B:
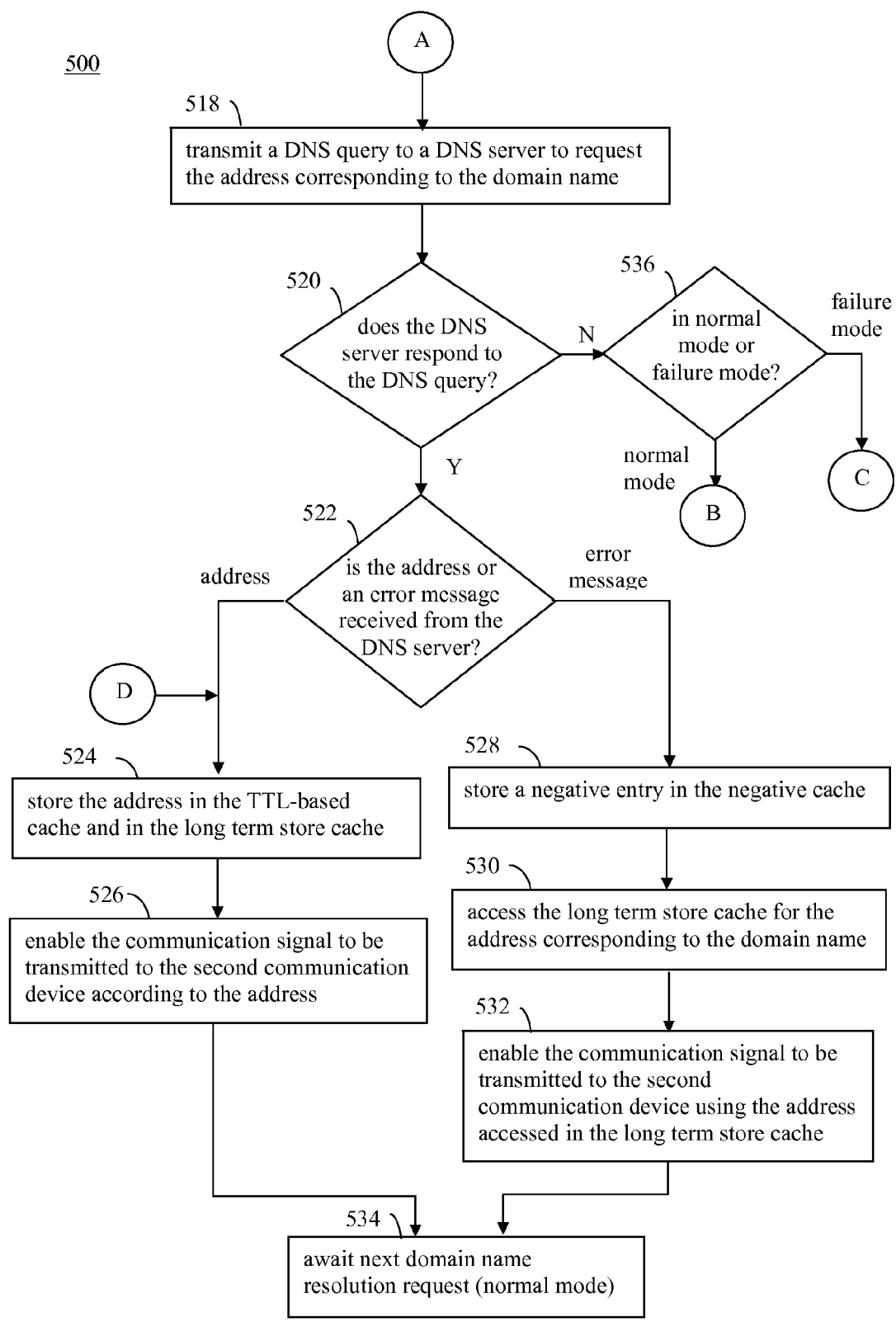

Referring to FIG. 5B, in step 518, a DNS query is transmitted to a DNS server to request the address corresponding to the domain name. For example, referring to FIG. 6, cache access logic module 602 may instruct DNS query generator 604 to generate DNS query 412, which includes a request to resolve the unresolved domain name. Communication module 404 receives DNS query 412 from DNS query generator 604, and may transmit DNS query 412 to DNS server 106 (FIG. 1) to request resolution of the domain name to an IP address. Operation proceeds to decision 520.

In decision 520, whether the DNS server responds to the DNS query is determined. If a response from DNS server 106 to the DNS query transmitted in step 518 is not detected by communication module 404 and/or DNS resolver 302, operation proceeds to decision 536. If a response from DNS server 106 is detected by communication module 404 and/or DNS resolver 302, operation proceeds to decision 522.

In decision 522, whether the address or an error message is received from the DNS server in response to the DNS query is determined. For example, referring to FIG. 6, cache access logic module 602 may receive DNS response 414 from communication module 404, which was received by communication module 404 from DNS server 106. If cache access logic module 602 determines that an IP address for the domain name is provided in DNS response 414, operation proceeds to step 524. If cache access logic module 602 determines that an error message is provided in DNS response 414, operation proceeds to step 528. Examples of error messages that may be received include NXDOMAIN (indicates a name error, where the domain name does not exist), NODATA (indicates that the domain name is valid, for the given class, but there are no records of the given type) and SERVFAIL (indicates a DNS server failure).

In step 524, the address is stored in the TTL-based cache and in the long term store cache. For example, referring to FIG. 6, cache access logic module 602 may store the domain name, the received IP address, and a time out value received in DNS response 414 in an entry (e.g., a temporary entry 702 of FIG. 7) in TTL-based cache 306. Furthermore, cache access logic module 602 may store the domain name and the received IP address in an entry (e.g., a long term entry 706 of FIG. 7) in long term store cache 310. Still further, if a negative entry for the domain name is present in negative cache 308 (e.g., a negative entry 704 of FIG. 7), the negative entry may be removed from negative cache 308. Operation proceeds to step 526.

In step 526, the communication signal is enabled to be transmitted to the second communication device according to the address. For example, cache access logic module 602 may provide the received IP address to communication module 404 in resolved IP address 416, to enable communication module 404 to transmit communication signal 418 to the communication device having the resolved IP address. Operation proceeds to step 534.

In step 528, a negative entry is stored in the negative cache. For example, because an error message was received from DNS server 106 in response to a DNS query, cache access logic module 602 may store a negative entry (e.g., a negative entry 704) in negative cache 308 to indicate the domain name for the failed DNS query. Operation proceeds to step 530.

In step 530, the long term store cache is accessed for the address corresponding to the domain name. For example, cache access logic module 602 may access long term store cache 310 for an IP address corresponding to the domain name of the failed DNS query. Operation proceeds to step 532.

In step 532, the communication signal is enabled to be transmitted to the second communication device using the address accessed in the long term store cache. For example, cache access logic module 602 may provide the IP address retrieved from long term store cache 310 to communication module 404 in resolved IP address 416, to enable communication module 404 to transmit communication signal 418 to the communication device having the retrieved IP address. Operation proceeds to step 534.

In step 534, a next domain name resolution request is awaited. Furthermore, if the current mode for DNS resolver 302 is failure mode, DNS resolver 302 transitions from failure mode to normal mode.

Figure 5C:
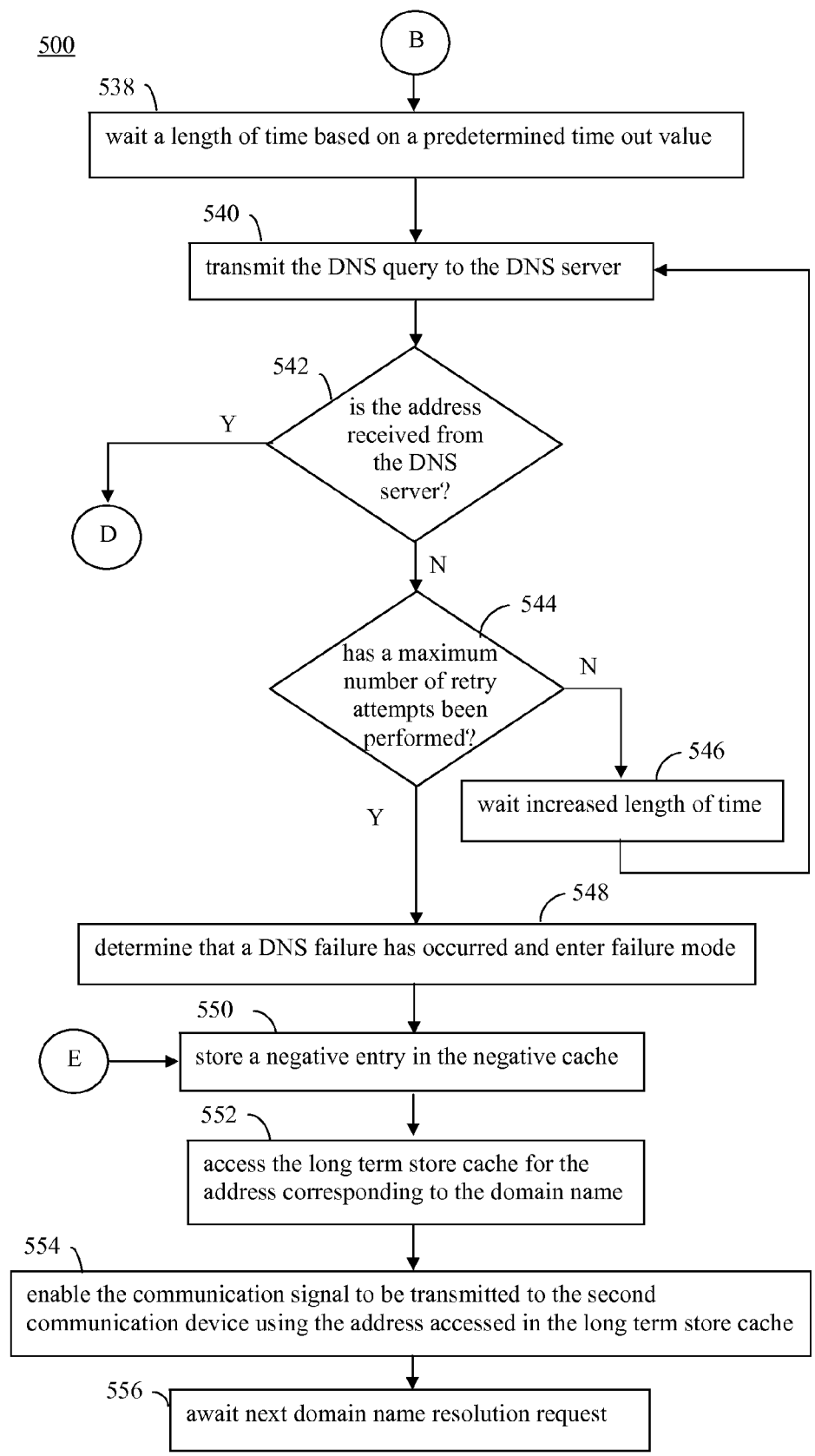
Figure 5D:
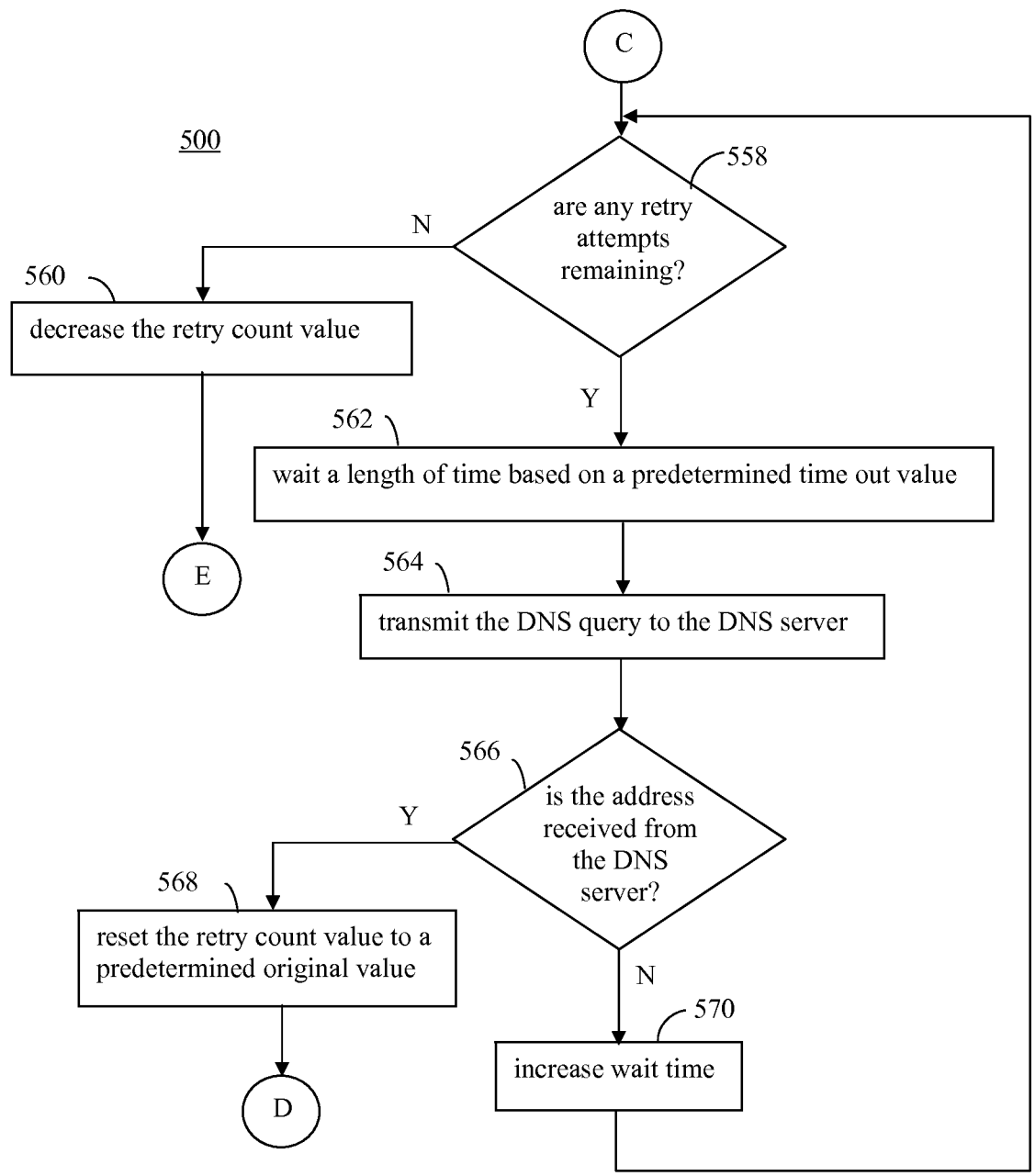

In decision 536, whether DNS resolver 302 is in normal mode or failure mode is determined. If DNS resolver 302 is in normal mode, operation proceeds to step 538 (FIG. 5C). If DNS resolver 302 is in failure mode, operation proceeds to decision 558 (FIG. 5D).

As shown in FIG. 6, cache access logic module 602 may include a back-off retry module 606. Back-off retry module 606 may be configured to execute a back-off and retry procedure to retry a failed DNS query. For instance, steps 538, 540, 542, 544, and 546 shown in FIG. 5C correspond to an example back-off and retry procedure that may be performed. In an embodiment, steps 538, 540, 542, 544, and 546 may be performed by back-off retry module 606 to execute a back-off and retry procedure, or back-off retry module 606 may execute other form of back-off and retry procedure, as would be known to persons skilled in the relevant art(s).

The back-off retry procedure of steps 538, 540, 542, 544, and 546 is described for illustrative purposes with respect to FIG. 8. FIG. 8 shows a block diagram of a back-off retry system 800 that may be included in cache access logic module 602, according to an example embodiment. As shown in FIG. 8, back-off retry system 800 includes a storage 802 and back-off retry module 606. Storage 802 stores a wait time timeout value 804 and a retry count value 806. Back-off retry module 606 includes a retry count modifier module 808. Back-off retry system 800 is described for illustrative purposes with respect to FIG. 5C.

Referring to FIG. 5C, in step 538, a length of time is waited based on a predetermined time out value. For example, as shown in FIG. 8, back-off retry module 606 may receive wait time timeout value 804 from storage 802. Back-off retry module 606 is configured to wait the length of time indicated by wait time timeout value 804. Operation proceeds to step 540.

In step 540, the DNS query is transmitted to the DNS server. For example, cache access logic module 602 may instruct DNS query generator 604 to retransmit DNS query 412, which includes the request to resolve the unresolved domain name. Communication module 404 receives DNS query 412 from DNS query generator 604, and may retransmit DNS query 412 to DNS server 106 (FIG. 1) to request resolution of the domain name to an IP address. Operation proceeds to decision 542.

In decision 542, whether the address is received from the DNS server is determined. If a response from DNS server 106 to the DNS query transmitted in step 540 is not detected by communication module 404 and/or DNS resolver 302, operation proceeds to decision 544. If a response from DNS server 106 is detected, operation proceeds to step 524 (FIG. 5B).

In decision 544, whether a maximum number of retry attempts has been performed is determined. For example, in an embodiment, as shown in FIG. 8, back-off retry module 606 may access retry count value 806 in storage 802. Retry count value 806 is a predetermined value indicating a maximum number of DNS query retries to be performed (step 540) before indicating a DNS server response failure. Back-off retry module 606 is configured to count a number of DNS query retries, and when the number or retries is equal to retry count value 806, the maximum number of retry attempts is reached. If back-off retry module 606 determines that the maximum number of retry attempts has been performed, operation proceeds to step 548. If the maximum number of retry attempts has not been performed, operation proceeds to step 546.

In step 546, an increased length of time is waited. For example, in an embodiment, prior to each instance of re-transmitting a DNS query during a particular back-off retry procedure, an increased amount of time may be waited compared to the immediately prior re-transmission. In this manner, network bandwidth may be conserved. As shown in FIG. 8, back-off retry module 606 may receive wait time timeout value 804 from storage 802. Prior to each subsequent DNS query re-transmission, back-off retry module 606 is configured to wait an increasingly greater length of time than the amount of indicated by wait time timeout value 804. For example, the increase in time may be exponential (e.g., the amount of wait time may be doubled, or otherwise increased, prior to each DNS query re-transmission). Operation proceeds to step 540.

In step 548, a DNS failure is determined to have occurred, and a failure mode is entered. For example, back-off retry module 606 may indicate to cache access logic module 602 that the back-off and retry algorithm failed to resolve the domain name, and as a result, cache access logic module 602 may indicate the current mode to be failure mode. Operation proceeds to step 550.

In step 550, a negative entry is stored in the negative cache. For example, because the most recent iteration of the back-up and retry procedure failed, cache access logic module 602 may store a negative entry (e.g., a negative entry 704) in negative cache 308 to indicate the domain name that was not resolved. Operation proceeds to step 552.

In step 552, the long term store cache is accessed for the address corresponding to the domain name. For example, cache access logic module 602 may access long term store cache 310 for an IP address corresponding to the domain name that was not resolved. Operation proceeds to step 554.

In step 532, the communication signal is enabled to be transmitted to the second communication device using the address accessed in the long term store cache. For example, cache access logic module 602 may provide the IP address retrieved from long term store cache 310 to communication module 404 in resolved IP address 416, to enable communication module 404 to transmit communication signal 418 to the communication device having the retrieved IP address. Operation proceeds to step 556.

In step 556, a next domain name resolution request is awaited.

FIG. 5D describes the back-off retry algorithm when in failure mode. Referring to FIG. 5D, in decision 558, whether any retry attempts are remaining is determined. Similarly to the description above, back-off retry module 606 of FIG. 8 may access retry count value 806 in storage 802, which indicates a maximum number of DNS query retries to be performed before indicating a DNS server response failure. Back-off retry module 606 is configured to count a number of DNS query retries, and when the number or retries is equal to retry count value 806, the maximum number of retry attempts is reached. If back-off retry module 606 determines that any retry attempts are remaining, operation proceeds to step 562. If no retry attempts are remaining, operation proceeds to step 560.

In step 560, the retry count value is decreased. To decrease the amount of retry attempts made during subsequent attempts to resolve the domain name where the DNS server continues to be non-responsive, the retry count value is decreased after each cycle of DNS queries. For example, in an embodiment, as shown in FIG. 8, retry count modifier module 808 may be configured to use a modify signal 810 to decrease (e.g., decrement or otherwise reduce) the value of retry count value 806 in storage 802. Alternatively, retry count modifier module 808 may decrease a value of retry count value 806 that is read from storage 802 and maintained in back-off retry module 606.

In step 562, a length of time is waited based on a predetermined time out value. For example, as shown in FIG. 8, back-off retry module 606 may receive wait time timeout value 804 from storage 802. Back-off retry module 606 is configured to wait the length of time indicated by wait time timeout value 804. Operation proceeds to step 564.

In step 564, the DNS query is transmitted to the DNS server. For example, cache access logic module 602 may instruct DNS query generator 604 to retransmit DNS query 412, which includes the request to resolve the unresolved domain name. Communication module 404 receives DNS query 412 from DNS query generator 604, and may retransmit DNS query 412 to DNS server 106 (FIG. 1) to request resolution of the domain name to an IP address. Operation proceeds to decision 566.

In decision 566, whether the address is received from the DNS server is determined. If a response from DNS server 106 to the DNS query transmitted in step 564 is not detected by communication module 404 and/or DNS resolver 302, operation proceeds to decision 570. If the address is received from DNS server 106, operation proceeds to step 568. Note that if an error message is received from DNS server 106, in an embodiment, a negative entry may be stored in negative cache 308, long term storage 310 may be accessed for the IP address corresponding to the domain name, the communication signal may be transmitted to the second communication device using the IP address, and a next domain name resolution request may be waited for.

In step 568, the retry count value is reset to a predetermined original value. For example, retry count modifier module 808 may be configured to reset the value of retry count value 806 to its original value in storage 802 (if retry count value 806 was decreased in storage 802), or may be configured to read the original value of retry count value 806 from storage 802 to overwrite a value for retry count value 806 maintained in back-off retry module 606. In this manner, a next time that a back-off retry algorithm is used to transmit DNS queries to the DNS server to resolve a domain name, the back-off retry algorithm will use the original maximum number of DNS queries.

In step 570, the wait time is increased. Similarly to the description further above, in an embodiment, prior to each instance of re-transmitting a DNS query during a particular back-off retry procedure, an increased amount of time may be waited compared to the immediately prior re-transmission. In this manner, network bandwidth may be conserved. As shown in FIG. 8, back-off retry module 606 may receive wait time timeout value 804 from storage 802. Prior to each DNS query re-transmission, back-off retry module 606 is configured to wait an increasingly greater length of time than the amount of indicated by wait time timeout value 804. For example, the increase in time may be exponential (e.g., the amount of wait time may be doubled, or otherwise increased, prior to each DNS query re-transmission). Operation proceeds to step 558.

A. Example Domain Name Resolution Request

An example domain name resolution request is described as follows with respect to flowchart 500 of FIGS. 5A-5D and the cache entries shown in FIG. 7 for purposes of illustration. For instance, the domain name "deviceZ" may be requested to be resolved in step 502 (FIG. 5A). Referring to step 504 and decision 506, because the domain name "deviceZ" is not present in any entries 702 of TTL-based cache 306, operation would proceed to step 508. Referring to step 508 and decision 510, because the domain name "deviceZ" does not have a negative entry 704 in negative cache 308, operation would proceed to step 518. Referring to step 518 (FIG. 5B), the domain name of request 410, "deviceZ," may be included in DNS query 412 transmitted to DNS server 106, to be resolved to an IP address. Referring to decision 520, DNS server 106 may not respond to DNS query 412. In such case, operation would proceed to decision 536. Referring to step 536, if the failure to respond to the DNS query is the first such failure, DNS resolver 302 may be in normal mode. In such case, operation would proceed to step 538 (FIG. 5C).

Referring to step 538, a back-off retry algorithm is begun that includes step 540, decision 542, decision 544, and step 546. In step 538, the time value of wait time timeout value 804 (FIG. 8) may be waited. In step 540, DNS query 412 may be re-transmitted to DNS server 106, to attempt to resolve "deviceZ" to an IP address. In decision 542, the address may not be received from DNS server 106, and thus operation proceeds to decision 544. In decision 544, initially the maximum number of retry attempts (indicated by retry count value 806) may not be reached, and thus operation proceeds to step 546. In step 546, the wait time (which was initially wait time timeout value 804) is increased, such as by doubling wait time timeout value 804. This back-off retry algorithm may be repeated until the number of retries reaches the value of retry count value 806, and operation may proceed from decision 544 to step 548.

In step 548, failure mode is entered. Operation proceeds to step 550, and a negative entry may be stored for the domain name "deviceZ" in negative cache 308. In step 552, and referring to FIG. 7, long term store cache 310 may be accessed for the IP address of "113.42.232.7" corresponding to the domain name "deviceZ" in entry 706c. In step 554, communication signal 418 may be transmitted to a second communication device that has the IP address of "113.42.232.7." In step 556, a next domain resolution request is awaited.

Subsequently, in step 502 (FIG. 5A), the domain name "deviceZ" may be requested a second time to be resolved. Referring to step 504 and decision 506, because the domain name "deviceZ" is not present in any entries 702 of TTL-based cache 306, operation would proceed to step 508. Referring to step 508 and decision 510, and assuming that the negative entry entered into negative cache 308 for "deviceZ" subsequently expired, operation would proceed to step 518. Referring to step 518 (FIG. 5B), the domain name of request 410, "deviceZ," may be included in DNS query 412 transmitted to DNS server 106, to be resolved to an IP address. Referring to decision 520, DNS server 106 may not respond to DNS query 412. In such case, operation would proceed to decision 536. Referring to step 536, DNS resolver 302 is in failure mode due to the prior failure to resolve "deviceZ." In such case, operation would proceed to decision 558 (FIG. 5D).

Referring to decision 558, a back-off retry algorithm is begun that further includes step 562, step 564, decision 566, and step 570. In decision 558, initially the maximum number of retry attempts (indicated by retry count value 806) may not be reached, and thus operation proceeds to step 562. In step 562, the time value of wait time timeout value 804 (FIG. 8) may be waited. In step 564, DNS query 412 may be re-transmitted to DNS server 106, to attempt to resolve "deviceZ" to an IP address. In decision 566, the address may not be received from DNS server 106, and thus operation proceeds to step 546. In step 546, the wait time (which was initially wait time timeout value 804) is increased, such as by doubling wait time timeout value 804. This back-off retry algorithm may be repeated until the number of retries reaches the value of retry count value 806, and operation may proceed from decision 558 to step 560.

In step 560, the retry count value is decreased. For example, the value of retry count value 806 may be decremented so that one fewer DNS query iteration is performed during the next back-off retry procedure iteration. Operation proceeds to step 550 (FIG. 5C), where a negative entry may be stored for the domain name "deviceZ" in negative cache 308. In step 552, and referring to FIG. 7, long term store cache 310 may be accessed for the IP address of "113.42.232.7" corresponding to the domain name "deviceZ" in entry 706c. In step 554, communication signal 418 may be transmitted to a second communication device that has the IP address of "113.42.232.7." In step 556, a next domain resolution request is awaited.

In an embodiment, if the DNS server continues to be non-responsive during subsequent requests to resolve "deviceZ", retry count value 806 may be eventually decreased to zero by sufficient repetitions of step 560 (FIG. 5D). Once retry count value 806 is decreased to zero, no back-off retry operations will be performed (because 0 retries will be indicated when decision 558 is reached) after the DNS query of step 540 (FIG. 5C) is transmitted. In such an embodiment, one DNS query is transmitted per domain resolution request, and if no response to the DNS query is received, a failure is indicated (and long term store cache 310 may be accessed for the IP address). By reducing the number of, and eventually eliminating the back-off retry operations, the amount of network traffic due to DNS server failures is substantially reduced.

For instance, FIG. 9 shows a time line 900 of DNS queries that may be performed in an example embodiment. In the example of FIG. 9, six requests to resolve an IP address for the same domain name are received, indicated at time points 902a-902f. As such, at each of time points 902a-902d, a corresponding initial DNS query is transmitted (e.g., step 518 in FIG. 5B), as indicated by dotted line in FIG. 9. In each case, the DNS server does not respond to the initial DNS query. As a result, back-off retry operations are performed following a portion of the failed DNS queries. In the current example, for illustrative purposes, a value of 3 is used for retry count value 806, and a value of 100 milliseconds (msecs) is used for wait time timeout value 804. Furthermore, at each iteration of steps 546 (FIG. 5C) and 570 (FIG. 5D), wait time is doubled.

For example, with regard to the DNS query at time point 902a, because no response is received, back-off retry operation 904a is performed (starting at step 538 in FIG. 5C), in which the DNS query is re-transmitted a total of three times—at each of time points 906a-906c. 100 milliseconds of time passes between the DNS queries at time points 906a and 906b, and 200 milliseconds of time passes between the DNS queries at time points 906b and 906c. Because retry count value 806 is 3, back-off retry operation 904a ends after three DNS query retransmissions, and because no response is received from the DNS server, failure mode is entered (step 548).

With regard to the DNS query at time point 902b, because no response is received, back-off retry operation 904b is performed (starting at decision 558 in FIG. 5D), in which the DNS query is re-transmitted a total of three times—at each of time points 908a-908c. 100 milliseconds of time passes between the DNS queries at time points 908a and 908b, and 200 milliseconds of time passes between the DNS queries at time points 908b and 908c. Because the retry count value is 3, back-off retry operation 904b ends after three DNS query retransmissions. Furthermore, the retry count value is decreased (step 560 of FIG. 5D) (from 3 to 2 in the current example).

With regard to the DNS query at time point 902c, because no response is received, back-off retry operation 904c is performed (starting at decision 558 in FIG. 5D), in which the DNS query is re-transmitted a total of two times—at each of time points 910a and 910b. 100 milliseconds of time passes between the DNS queries at time points 910a and 910b. Because the retry count value is 2, back-off retry operation 904c ends after two DNS query retransmissions. Furthermore, the retry count value is decreased (step 560 of FIG. 5D) from 2 to 1 in the current example.

With regard to the DNS query at time point 902d, because no response is received, back-off retry operation 904d is performed (starting at decision 558 in FIG. 5D), in which the DNS query is re-transmitted one time—at time point 912a. Because the retry count value is 1, back-off retry operation 904d ends after one DNS query retransmission. Furthermore, the retry count value is decreased (step 560 of FIG. 5D) from 1 to 0 in the current example.

With regard to the DNS query at time point 902e, no response is received. However, because the retry count value is zero, no back-off retry operation is performed. Similarly, with regard to the DNS query at time point 902f, no response is received, and because the retry count value is zero, no back-off retry operation is performed. In a similar fashion, no back-off retry operations will be performed for subsequent failed DNS queries until after a DNS query receives a response from the DNS server that includes a domain name resolution, and the mode transitions from failure mode back to normal mode (e.g., step 534 of FIG. 5B).

B. Further Example Embodiments and Advantages

Negative caching using negative cache 308 works in conjunction with long term caching by storing DNS lookup failures for a defined timeout period so that subsequent lookups on a domain name will be taken directly from long term store cache 310 rather than continuously retrying a DNS query. With an entry in negative cache 308, a cumulative timeout period inherent in a rapid succession of failed DNS lookups may be avoided, thereby satisfying timing requirements.

RFC 2308 recommends that for error messages (e.g., NXDOMAIN, NODATA and SERVFAIL), a Start Of Authority (SOA) record TTL can be used as TTL for negative caching. This RFC has a requirement on DNS servers to include the SOA record in their response, but experience has shown that many DNS servers do not follow all the RFC requirements. Thus, in an embodiment, a configured value may be used instead.

DNS RFCs (request for comments) 1034 and 1035 specify a simple algorithm for back-off retry for DNS resolvers, similar to the back-off retry algorithm described above. DNS RFCs 1034 and 1035 state that if DNS servers are non-responsive, a DNS resolver should timeout and retry a limited number of times. Specific timeout values or number of retries are not specified. Current EMTA DNS resolvers uses timeout values of 2 seconds, a number of retries value of 3, and an exponential backoff retry algorithm. The delay can then be estimated as the timeout value multiplied by the retry count. For example, a maximum delay can be as much as $$\text{SUM 1:} N(Tn), \text{ where } Tn = 2 \times Tn - 1 \qquad \text{Equation 1}$$

where
  Tn=the timeout value, and
  N=the number of retries.
So for a timeout value (Tn) (wait time timeout value 804) of 2 seconds, and a retry count value (N) (retry count value 806) of 3, the delay may be 14 seconds.

Configurability: In embodiments, the following parameters may be made configurable so that the operators can set them depending on the traffic and demands of their networks. For example, in a VoIP application, if the maximum tolerance for receiving a dial tone is 1.5 seconds, then the wait time timeout value can be set to 0.5 seconds and the retry count value may be initialized to 2, totaling 1.5 seconds, before an entry is retrieved from long term store cache 310. The following management information bases (MIBs) are examples that may be used to configure various system parameters.

Timeout value for DNS queries: The following MIB may be used to configure the wait time timeout value used for DSN queries:

```
emtaBaseDnsBaseTimeout OBJECT-TYPE
    SYNTAX                  Unsigned32
    UNITS                   "milliseconds"
    MAX-ACCESS              read-write
    STATUS                  current
    DESCRIPTION
        "This object controls the base timeout value for DNS queries.
        The DNS client DNS query times out due to no response from
        the DNS server, the EMTA DNS resolver waits this period of
        time before sending the next DNS Query if no response is
        received from the DNS server. This is exponentially increased
        on subsequent DNS queries for the same transaction."
    DEFVAL {500}
```

Max Retry value for DNS retries: The following MIB may be used to configure the maximum/initial retry count value for DNS queries:

```
emtaBaseDnsMaxRetry OBJECT-TYPE
    SYNTAX                  Unsigned32
    MAX-ACCESS              read-write
    STATUS                  current
    DESCRIPTION
        "This object controls the maximum retry value for a DNS
        queries. When a DNS query times out due to no response from
        the DNS server, this is the maximum number of times that a
        DNS query is re-sent."
    DEFVAL {2}
```

Maximum TTL for Negative DNS RRs: The following MIB may be used to configure the timeout/expiration time value used for negative caching (negative cache 308):

```
emtaBaseDnsNegativeCacheTTL OBJECT-TYPE
    SYNTAX                  Unsigned32
    UNITS                   "seconds"
    MAX-ACCESS              read-write
    STATUS                  current
    DESCRIPTION
        "This object controls the maximum TTL value for DNS negative
        cache RRs. When a DNS query results in a response of
        NXDOMAIN, NODATA or SRVFAIL, and no SOA RR is
        included in the response, or due to a non-responsive DNS server
        the EMTA DNS resolver caches the negative RR with this TTL
        value."
    DEFVAL {300}
```

Example advantages: Currently EMTAs have little to no DNS fault tolerance. Referring to FIG. 2, if DNS server 226 is non-responsive and the cache for an entry is expired, EMTA performs a DNS backoff retry procedure. According to current hard-coded timeout values of 2 seconds and a retry count of 2, such a backoff retry procedure takes approximately 14 seconds. As there is no response, the FQDN is not resolved and a user never receives a response to voice activity. For example, the user may not receive a dial tone when the phone goes off-hook.

In one improvement, the timeout value is reduced from 2 seconds to 500 milliseconds. This results in reducing the backoff retry procedure from 14 seconds to 2.5 seconds. With this improvement, the backoff retry procedure runs to completion considerably faster, but if there is a failure, the user experience is not changed.

The addition of the permanent cache resolves the problem of the user never receiving a response to a DNS query, but leaves the issue of the long delay of 2.5 seconds before the response. This is because the EMTA needs to resolve the DNS address, and needs to get the latest updated DNS resolution as well as handling DNS servers that respond too slowly or suffer from excessive network traffic. So with current settings, the user may receive a response in around 2.5 seconds, which is fairly noticeable and could be improved.

In a further embodiment, negative caching, as described above, is used to resolve the delay issue. Negative caching saves the result of failed lookups for a fixed period of time (e.g., 5 minutes). On the first attempt, the user will experience the delay of 2.5 seconds which is acceptable, but still a slightly noticeable delay, as the EMTA (e.g., DNS resolver 204) tries to resolve the FQDN going through its backoff retry procedure. Once the EMTA determines that the FQDN resolution has failed due to a DNS server failure, this is cached as a negative cache. Therefore for the next five minutes, the user experiences no delays and has normal voice activity. Every 5 minutes, the user will observe the same short delay followed by 5 minutes of normal response time. This will continue until the DNS server is back online. Further enhancements are described as follows:

Configurability: The timeout, retry count and the negative cache TTL may be configured in any manner, including by SNMP (simple network management protocol). For example, these values may be obtained by accessing an SNMP server across a network. This approach enables the operator to choose the optimum values for their networks. Operators can gather statistics on the DNS server responses, their maximum and minimum delays and set these values accordingly to make the user experience more pleasant. For example, these values may be set according to the MIBs described above, or in another manner.

Adaptive Fault Tolerance: With the adaptive approach, the delays experienced by the user for every 5 minutes are reduced as the DNS server stays non-responsive. EMTA will reduce the number of retries every 5 minutes and the user will experience less delays. After the negative cache has expired as many times as the retry count, the user will experience no delays as the EMTA have adapted to the non-responsive DNS server. For example with timeout of 500 ms and retry count of 2, the user will experience a 2 second delay on the first attempt, a 1 second delay after 5 minutes, and a relatively unnoticeable 500 ms delay for the rest of the time until DNS server 226 comes back to a responsive state.

There can be serious problems when DNS servers fail, especially for Voice applications. This algorithm prevents the network from being flooded with DNS queries as voice signaling tries to connect and get response from signaling servers.

Further example advantages that may be provided by embodiments include continued voice service even in the case of a DNS server outage, reduced network traffic upon failures, and service providers being able to configure the fault tolerance parameters for optimal network traffic.

V. Example Computer Implementations

DNS resolver 302, DNS query generator 604, back-off retry module 606, and retry count modifier module 808 may be implemented in hardware, software, firmware, or any combination thereof. For example, DNS resolver 302, DNS query generator 604, back-off retry module 606, and/or retry count modifier module 808 may be implemented as computer program code configured to be executed in one or more processors. Alternatively, DNS resolver 302, DNS query generator 604, back-off retry module 606, and/or retry count modifier module 808 may be implemented as hardware logic/electrical circuitry.

The embodiments described herein, including systems, methods/processes, and/or apparatuses, may be implemented using well known servers/computers, such as a computer 1000 shown in FIG. 10. For example, communication devices 102 and 104, communication devices 202 and 204, and/or DNS server 106 can be implemented using one or more computers 1000. Computer 1000 is described as follows, for purposes of illustration. Alternatively, as described above, communication devices 102 and 104 and communication devices 202 and 204 may be implemented in other forms, such as IP telephones, for example.

Computer 1000 can be any commercially available and well known computer capable of performing the functions described herein, such as computers available from International Business Machines, Apple, Sun, HP, Dell, Cray, etc. Computer 1000 may be any type of computer, including a desktop computer, a server, etc.

Computer 1000 includes one or more processors (also called central processing units, or CPUs), such as a processor 1004. Processor 1004 is connected to a communication infrastructure 1002, such as a communication bus. In some embodiments, processor 1004 can simultaneously operate multiple computing threads.

Computer 1000 also includes a primary or main memory 1006, such as random access memory (RAM). Main memory 1006 has stored therein control logic 1028A (computer software), and data.

Computer 1000 also includes one or more secondary storage devices 1010. Secondary storage devices 1010 include, for example, a hard disk drive 1012 and/or a removable storage device or drive 1014, as well as other types of storage devices, such as memory cards and memory sticks. For instance, computer 1000 may include an industry standard interface, such a universal serial bus (USB) interface for interfacing with devices such as a memory stick. Removable storage drive 1014 represents a floppy disk drive, a magnetic tape drive, a compact disk drive, an optical storage device, tape backup, etc.

Removable storage drive 1014 interacts with a removable storage unit 1016. Removable storage unit 1016 includes a computer useable or readable storage medium 1024 having stored therein computer software 1028B (control logic) and/or data. Removable storage unit 1016 represents a floppy disk, magnetic tape, compact disk, DVD, optical storage disk, or any other computer data storage device. Removable storage drive 1014 reads from and/or writes to removable storage unit 1016 in a well known manner.

Computer 1000 also includes input/output/display devices 1022, such as monitors, keyboards, pointing devices, etc.

Computer 1000 further includes a communication or network interface 1018. Communication interface 1018 enables the computer 1000 to communicate with remote devices. For example, communication interface 1018 allows computer 1000 to communicate over communication networks or mediums 1042 (representing a form of a computer useable or readable medium), such as LANs, WANs, the Internet, etc. Network interface 1018 may interface with remote sites or networks via wired or wireless connections.

Control logic 1028C may be transmitted to and from computer 1000 via the communication medium 1042.

Any apparatus or manufacture comprising a computer useable or readable medium having control logic (software) stored therein is referred to herein as a computer program product or program storage device. This includes, but is not limited to, computer 1000, main memory 1006, secondary storage devices 1010, and removable storage unit 1016. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices, and the like. Such computer-readable storage media may store program modules that include computer program logic for DNS resolver 302, DNS query generator 604, back-off retry module 606, and retry count modifier module 808, and/or flowchart 500 (including any one or more steps of flowchart 500), and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents

What is claimed is:

1. A method in a first communication client device, comprising:
   receiving a request to resolve an address for a domain name corresponding to a second communication device;
   accessing a time-to-live (TTL)-based cache of the first communication client device for the address;
   accessing a negative cache of the first communication client device for a negative entry corresponding to the domain name if the address is not present in the TTL-based cache;
   accessing a long term store cache of the first communication client device for the address if the negative entry is present in the negative cache, wherein the long term store cache is configured to store addresses corresponding to respective domain names for an indefinite time period; and
   enabling a communication signal to be transmitted to the second communication device according to the address if the address is present in at least one of the TTL-based cache or the long term store cache.

2. The method of claim 1, wherein if the address is not present in the TTL-based cache and the negative entry is not present in the negative cache, performing:
   transmitting a DNS (domain name system) query to a DNS server to request the address;
   storing the address in the TTL-based cache and in the long term store cache if the address is received from the DNS server in response to the DNS query;
   enabling the communication signal to be transmitted to the second communication device according to the address if the address is received from the DNS server in response to the DNS query; and
   storing a negative entry in the negative cache, accessing the long term store cache for the address, and enabling the communication signal to be transmitted to the second communication device using the address accessed in the long term store cache if the DNS server provides an error message in response to the DNS query.

3. The method of claim 2, wherein if the DNS server does not respond to the transmitted DNS query, performing:
   executing a back-off retry operation having a retry count value that defines a number of retry attempts for transmitting the DNS query to the DNS server;
   determining that a DNS failure has occurred if the number of retry attempts corresponding to the retry count value is performed without receiving the requested address from the DNS server; and
   entering a failure mode if a DNS failure is determined to have occurred.

4. The method of claim 3, wherein said executing a back-off retry operation comprises:
   waiting a length of time based on a predetermined time out value;
   transmitting the DNS query to the DNS server after the length of time expires; and
   waiting an increased length of time and retransmitting the DNS query to the DNS server after the increased length of time each time that the DNS server does not respond to the transmitted DNS query until the retry count value for the back-off retry operation is reached.

5. The method of claim 3, wherein if the address is received from the DNS server in response to a DNS query during the back-off retry operation, performing:
   storing the address in the TTL-based cache and in the long term store cache; and
   enabling the communication signal to be transmitted to the second communication device.

6. The method of claim 3, wherein if a DNS failure is determined to have occurred, performing;
   decrementing the retry count value;
   storing the negative entry in the negative cache;
   accessing the long term store cache for the address; and
   enabling the communication signal to be transmitted to the second communication device according to the address accessed in the long term store cache.

7. The method of claim 6, further comprising:
   receiving a second request to resolve the address for the domain name;
   accessing the negative cache for the negative entry corresponding to the domain name;
   transmitting a second DNS query to the DNS server to request the address if the negative entry is not present in the negative cache;
   re-executing the back-off retry operation having a number of retry attempts indicated by the decremented retry count value if the DNS server does not respond to the transmitted second DNS query; and decreasing the decremented retry count value, storing the negative entry in the negative cache, accessing the long term store cache for the address, and enabling a second communication signal to be transmitted to the second communication device according to the address accessed in the long term store cache if the DNS server does not respond to the transmitted second DNS query during the re-executed back-off retry operation.

8. The method of claim 7, wherein if the address is received from the DNS server in response to the second DNS query during the re-executed back-off retry operation, performing:

resetting the decremented retry count value to a predetermined original retry count value;

storing the address in the TTL-based cache and in the long term store cache; and enabling a second communication signal to be transmitted to the second communication device.

9. A first communication client device, comprising:

a DNS (domain name system) resolver configured to process a request to resolve an address for a domain name corresponding to a second communication device, the DNS resolver including a time-to-live (TTL)-based cache of the first communication client device;

a negative cache of the first communication client device;

a long term store cache of the first communication client device; and a cache access logic module configured to access the TTL-based cache for the address;

wherein the cache access logic module is configured to access the negative cache for a negative entry corresponding to the domain name if the address is not present in the TTL-based cache;

wherein the cache access logic module is configured to access the long term store cache for the address if the negative entry is present in the negative cache, wherein the long term store cache is configured to store addresses corresponding to respective domain names for an indefinite time period; and wherein the cache access logic module is configured to enable the communication signal to be transmitted to the second communication device according to the address if the address is present in at least one of the TTL-based cache or the long term store cache.

10. The first communication client device of claim 9, wherein if the address is not present in the TTL-based cache and the negative entry is not present in the negative cache, the cache access logic module is configured to transmit a DNS (domain name system) query to a DNS server to request the address, to store the address in the TTL-based cache and in the long term store cache if the address is received from the DNS server in response to the DNS query, and to enable the communication signal to be transmitted to the second communication device according to the address if the address is received from the DNS server in response to the DNS query; and wherein the cache access logic module is configured to store a negative entry in the negative cache, to access the long term store cache for the address, and to enable the communication signal to be transmitted to the second communication device using the address accessed in the long term store cache if the DNS server provides an error message in response to the DNS query.

11. The first communication client device of claim 10, wherein the cache access logic module includes a back-off retry module; and wherein if the DNS server does not respond to the transmitted DNS query, the back-off retry module is configured to execute a back-off retry operation having a predetermined retry count value that defines a number of retry attempts for transmitting the DNS query to the DNS server, and the cache access logic module is configured to enter a failure mode if the number of retry attempts corresponding to the retry count value is performed without receiving the requested address from the DNS server.

12. The first communication client device of claim 11, wherein in order to execute the back-off retry operation, the back-off retry module is configured to wait a length of time based on a predetermined time out value, to enable the DNS query to be transmitted to the DNS server after the length of time expires, and to wait an increased length of time and enable the DNS query to be retransmitted to the DNS server after the increased length of time each time that the DNS server does not respond to the transmitted DNS query until the retry count value for the back-off retry operation is reached.

13. The first communication client device of claim 11, wherein if the address is received from the DNS server in response to a DNS query during the back-off retry operation, the cache access logic module is configured to store the address in the TTL-based cache and in the long term store cache and to enable the communication signal to be transmitted to the second communication device.

14. The first communication client device of claim 11, wherein if the cache access logic module is in failure mode, the back-off retry is configured to decrement the retry count value, and the cache access logic module is configured to store the negative entry in the negative cache, to access the long term store cache for the address, and to enable the communication signal to be transmitted to the second communication device according to the address accessed in the long term store cache.

15. The first communication client device of claim 14, wherein if a second request to resolve the address for the domain name is received:

the cache access logic module is configured to access the negative cache for the negative entry corresponding to the domain name, and to enable a second DNS query to be transmitted to the DNS server to request the address if the negative entry is not present in the negative cache;

the back-off retry module is configured to re-execute the back-off retry operation having a number of retry attempts indicated by the decremented retry count value if the DNS server does not respond to the transmitted second DNS query, and to decrease the decremented retry count value; and the cache access logic module is configured to store the negative entry in the negative cache, to access the long term store cache for the address, and to enable a second communication signal to be transmitted to the second communication device according to the address accessed in the long term store cache if the DNS server does not respond to the transmitted second DNS query during the re-executed back-off retry operation.

16. The first communication client device of claim 15, wherein if the address is received from the DNS server in response to the second DNS query during the re-executed back-off retry operation, the back-off retry module is configured to reset the decremented retry count value to a predetermined original retry count value, and the cache access logic module is configured to store the address in the TTL-based cache and in the long term store cache, and to enable a second communication signal to be transmitted to the second communication device.

17. The first communication client device of claim 10, wherein the first communication device is coupled to the DNS server through a DOCSIS (data over cable service interface specification) network.

18. The first communication client device of claim 9, wherein the first communication device is an internet protocol (IP) telephone.

19. The first communication client device of claim 9, wherein the communication signal is an instant message.

20. A computer readable storage device having computer program logic embodied in said computer readable storage medium for enabling a processor to process a request to resolve an address for a domain name corresponding to a communication device, the computer program logic including program code executable to perform operations comprising:

accessing a time-to-live (TTL)-based cache of the first communication client device for the address;

accessing a negative cache of the first communication client device for a negative entry corresponding to the domain name if the address is not present in the TTL-based cache;

accessing a long term store cache of the first communication client device for the address if the negative entry is present in the negative cache, wherein the long term store cache is configured to store addresses corresponding to respective domain names for an indefinite time period; and enabling a communication signal to be transmitted to the communication device according to the address if the address is present in at least one of the TTL-based cache or the long term store cache.

\* \* \* \* \*